US010664340B2

(12) United States Patent
Otsuka et al.

(10) Patent No.: US 10,664,340 B2
(45) Date of Patent: May 26, 2020

(54) FAILURE ANALYSIS PROGRAM, FAILURE ANALYSIS DEVICE, AND FAILURE ANALYSIS METHOD

(71) Applicant: FUJITSU LIMITED, Kawasaki-shi, Kanagawa (JP)

(72) Inventors: Hiroshi Otsuka, Kawasaki (JP); Yukihiro Watanabe, Kawasaki (JP); Masahiro Asaoka, Kawasaki (JP); Reiko Kondo, Yamato (JP); Ken Yokoyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 158 days.

(21) Appl. No.: 15/891,787

(22) Filed: Feb. 8, 2018

(65) Prior Publication Data

US 2018/0232270 A1 Aug. 16, 2018

(30) Foreign Application Priority Data

Feb. 16, 2017 (JP) ................................ 2017-026583

(51) Int. Cl.
*G06F 11/00* (2006.01)
*G06F 11/07* (2006.01)
*G06Q 10/00* (2012.01)

(52) U.S. Cl.
CPC ........ *G06F 11/079* (2013.01); *G06F 11/0706* (2013.01); *G06F 11/0751* (2013.01); *G06F 11/0769* (2013.01); *G06Q 10/20* (2013.01)

(58) Field of Classification Search
CPC ............... G06F 11/079; G06F 11/0706; G06F 11/0751; G06F 11/0769; G06F 11/0766;
(Continued)

(56) References Cited

U.S. PATENT DOCUMENTS 9,043,197 B1 * 5/2015 Pasca .................. G06F 17/277 704/9
2009/0249130 A1 10/2009 Shimada et al.
(Continued)

FOREIGN PATENT DOCUMENTS

JP H08-314751 11/1996
JP 2002-297796 10/2002
(Continued)

*Primary Examiner* — Joseph D Manoskey
(74) *Attorney, Agent, or Firm* — Fujitsu Patent Center

(57) ABSTRACT

A non-transitory computer-readable storage medium storing therein a failure analysis program that causes a computer to execute a process includes: extracting, for respective incidents, first material names that satisfy a first condition from character strings included in each incident; extracting, for the respective incidents, second material names, which are the same material names as the first material names, from the character strings included in each incident; calculating a combination of feature values corresponding respectively to the one or more features from character strings correlated with the extracted second material names, for the respective incidents and for the respective second material names; and specifying a specific combination that satisfies a second condition from the combinations of feature values corresponding to the respective material names, for the respective second material names.

12 Claims, 29 Drawing Sheets

(58) Field of Classification Search
CPC .. G06F 11/0775; G06F 11/0781; G06Q 10/20
See application file for complete search history.

(56) References Cited

U.S. PATENT DOCUMENTS

| | | | | |
|---|---|---|---|---|
| 2013/0325877 | A1* | 12/2013 | Niazi | G06Q 30/0203 707/748 |
| 2014/0006861 | A1* | 1/2014 | Jain | G06Q 30/01 714/26 |
| 2017/0103061 | A1* | 4/2017 | Kobayashi | G06F 17/2785 |
| 2017/0124475 | A1* | 5/2017 | Anderson | G06N 5/045 |
| 2017/0315854 | A1* | 11/2017 | Movsisyan | G06F 11/0709 |
| 2019/0089577 | A1* | 3/2019 | Misra | H04L 41/0636 |

FOREIGN PATENT DOCUMENTS

| | | |
|---|---|---|
| JP | 2003-345628 | 12/2003 |
| JP | 2007-249490 | 9/2007 |
| JP | 2009-238010 | 10/2009 |
| JP | 2010-066841 | 3/2010 |
| JP | 2010-257066 | 11/2010 |
| JP | 2015-153078 | 8/2015 |

* cited by examiner

SPECIFIC EXAMPLE OF INCIDENT INFORMATION 131 OF WHICH INCIDENT ID IS 1

(ITEM NUMBER 1)

```
[root@localhost ~]# ifconfig -a
eth0   Link encap:Ethernet  HWaddr 00:80:00:00:00:00
       inet addr:192.168.0.1  Bcast:192.168.0.255  Mask:255.255.255.0
       UP BROADCAST RUNNING MULTICAST  MTU:1500  Metric:1
```

131a — `[root@localhost ~]# ifconfig -a`
131b — (remainder of ifconfig output)

SPECIFIC EXAMPLE OF INCIDENT INFORMATION 131 OF WHICH INCIDENT ID IS 2

(ITEM NUMBER 1)

THE FOLLOWINGS ARE QUESTIONS WITH REGARD TO COUNTERMEASURES FOR INCIDENT
(OMITTED)
THE FOLLOWING ARE CHECKED CONTENTS.

131c

131d

```
[root@localhost ~]# cat /var/log/messages
Dec  2 11:59:55 localhost kernel: Slow work thread pool: Starting up
Dec  2 11:59:55 localhost kernel: Slow work thread pool: Ready
Dec  2 11:59:55 localhost kernel: FS-Cache: Loaded
Dec  2 11:59:55 localhost kernel: NFS: Registering the id_resolver
Dec  2 11:59:55 localhost kernel: FS-Cache: Netfs 'nfs' registered
...
```

⋮

SPECIFIC EXAMPLE OF INCIDENT INFORMATION 131 OF WHICH INCIDENT ID IS 3

(ITEM NUMBER 1)

```
[root@localhost ~]# netstat -an
Proto Recv-Q Send-Q Local Address      Foreign Address      State
tcp       0      0  127.0.0.1:50990    192.168.0.2:22       ESTABLISHED
tcp       0      0  127.0.0.1:41346    192.168.0.1:22       ESTABLISHED
tcp       0      0  127.0.0.1:632      192.168.0.3:2049     ESTABLISHED
```
...

(ITEM NUMBER 2)

```
[root@localhost ~]# dstat --tcp
---tcp-sockets---
lis  act syn tim clo
 38    4   0   0   0
 38    4   0   0   0
 38    4   0   0   0
```
...

SPECIFIC EXAMPLE OF INCIDENT INFORMATION 131 OF WHICH INCIDENT ID IS 4

(ITEM NUMBER 5)

...

AS A RESULT OF RETRY, THE FOLLOWING RESULTS ARE OBTAINED FOR ifconfig : — 131i ⤴ 131j
eth0   Link encap:Ethernet  HWaddr 00:80:00:00:00:00
       inet addr:10.0.100.5  Bcast:10.0.100.255  Mask:255.255.254.0
       UP BROADCAST RUNNING MULTICAST  MTU:1500  Metric:1

...

SPECIFIC EXAMPLE OF INCIDENT INFORMATION 131 OF WHICH INCIDENT ID IS 5

(ITEM NUMBER 3)

FROM SITUATION, IT IS CONSIDERED THAT THE CAUSE IS XX.
PLEASE EXTRACT THE FOLLOWING INFORMATION. THE RESULT FOR ifconfig IS NOT NEEDED.
IN THE FOLLOWING MATERIALS, ...
MOREOVER, ...

SPECIFIC EXAMPLE OF FIRST FEATURE VALUE INFORMATION 132

| ID | INCIDENT ID | ITEM NUMBER | MATERIAL NAME | SETTING VALUE | TIME POINT | TABLE FORM | NUMERICAL VALUE |
|---|---|---|---|---|---|---|---|
| 1 | 1 | 1 | ifconfig | Y | N | N | N |
| 2 | 2 | 1 | /var/log/messages | Y | Y | N | N |
| 3 | 2 | 3 | ifconfig | Y | N | N | N |
| 4 | 2 | 4 | ifconfig | Y | N | N | N |
| 5 | 3 | 1 | netstat | Y | N | Y | N |
| 6 | 3 | 2 | dstat | N | N | Y | Y |
| 7 | 3 | 3 | semanage | N | N | Y | N |
| 8 | 5 | 3 | ifconfig | N | N | N | N |
| 9 | 5 | 5 | /var/log/messages | Y | Y | N | N |
| 10 | 6 | 1 | ifconfig | Y | N | N | N |
| 11 | 6 | 2 | semanage | N | N | Y | N |

FIG.20

SPECIFIC EXAMPLE OF SECOND FEATURE VALUE INFORMATION 133

| ID | INCIDENT ID | ITEM NUMBER | MATERIAL NAME | SETTING VALUE | TIME POINT | TABLE FORM | NUMERICAL VALUE |
|---|---|---|---|---|---|---|---|
| 1 | 1 | 1 | ifconfig | Y | N | N | N |
| 2 | 2 | 1 | /var/log/messages | Y | Y | N | N |
| 3 | 2 | 3 | ifconfig | Y | N | N | N |
| 4 | 2 | 4 | ifconfig | Y | N | N | N |
| 5 | 3 | 1 | netstat | Y | N | Y | N |
| 6 | 3 | 2 | dstat | N | N | Y | Y |
| 7 | 3 | 3 | semanage | N | N | Y | N |
| 8 | 4 | 5 | ifconfig | Y | N | N | N |
| 9 | 5 | 3 | ifconfig | N | N | N | N |
| 10 | 5 | 5 | /var/log/messages | Y | Y | N | N |
| 11 | 6 | 1 | ifconfig | Y | N | N | N |
| 12 | 6 | 2 | semanage | N | N | Y | N |
| 13 | 6 | 4 | semanage | N | N | Y | N |

FIG.21

SPECIFIC EXAMPLE OF CLUSTER INFORMATION 134

| ID | MATERIAL NAME | SETTING VALUE | TIME POINT | TABLE FORM | NUMERICAL VALUE |
|---|---|---|---|---|---|
| 1 | ifconfig | Y | N | N | N |
| 2 | ifconfig | Y | N | N | N |
| 3 | ifconfig | Y | N | N | N |
| 4 | ifconfig | Y | N | N | N |
| 5 | ifconfig | N | N | N | N |
| 6 | ifconfig | Y | N | N | N |

FIG.22

SPECIFIC EXAMPLE OF CLUSTER FEATURE INFORMATION 135

| ID | MATERIAL NAME | SETTING VALUE | TIME POINT | TABLE FORM | NUMERICAL VALUE |
|---|---|---|---|---|---|
| 1 | ifconfig | Y | N | N | N |
| 2 | /var/log/messages | Y | Y | N | N |
| 4 | netstat | N | N | Y | N |
| 5 | dstat | N | N | Y | Y |
| 6 | semanage | N | N | Y | N |

FIG.23

SPECIFIC EXAMPLE OF MATERIAL NAME INFORMATION 136

| ID | INCIDENT ID | MATERIAL NAME |
|---|---|---|
| 1 | 1 | ifconfig, |
| 2 | 2 | ifconfig, /var/log/messages, semanage, |
| 3 | 3 | netstat, dstat |
| 4 | 4 | ifconfig |
| 5 | 5 | /var/log/messages |
| 6 | 6 | ifconfig, semanage |

FIG.28

SPECIFIC EXAMPLE OF FIRST FEATURE VALUE INFORMATION 132a

| ID | INCIDENT ID | ITEM NUMBER | MATERIAL NAME | SETTING VALUE | TIME POINT | TABLE FORM | NUMERICAL VALUE |
|---|---|---|---|---|---|---|---|
| 1 | 1 | 1 | ifconfig | Y | N | N | N |
| 2 | 2 | 1 | /var/log/messages | Y | Y | N | N |
| 3 | 2 | 3 | ifconfig | Y | N | N | N |
| 4 | 2 | 4 | ifconfig | Y | N | N | N |
| 5 | 3 | 1 | netstat | Y | N | Y | N |
| 6 | 3 | 2 | dstat | N | N | Y | Y |
| 7 | 3 | 3 | semanage | N | N | Y | N |
| 8 | 5 | 3 | ifconfig | N | N | N | N |
| 9 | 5 | 5 | /var/log/messages | Y | Y | N | N |
| 10 | 6 | 1 | ifconfig | Y | N | N | N |
| 11 | 6 | 2 | semanage | N | N | Y | N |
| 12 | 7 | 2 | AAA | Y | Y | Y | Y |
| 13 | 8 | 3 | AAA | N | N | N | N |

FIG.29

SPECIFIC EXAMPLE OF CLUSTER INFORMATION 134a

| ID | MATERIAL NAME | SETTING VALUE | TIME POINT | TABLE FORM | NUMERICAL VALUE |
|---|---|---|---|---|---|
| 1 | AAA | Y | Y | Y | Y |
| 2 | AAA | N | N | N | N |

FAILURE ANALYSIS PROGRAM, FAILURE ANALYSIS DEVICE, AND FAILURE ANALYSIS METHOD

CROSS-REFERENCE TO RELATED APPLICATION

This application is based upon and claims the benefit of priority of the prior Japanese Patent Application No. 2017-026583, filed on Feb. 16, 2017, the entire contents of which are incorporated herein by reference.

FIELD

The present invention relates to a failure analysis program, a failure analysis device, and a failure analysis method.

BACKGROUND

For example, a business operator who provides a service to users (hereinafter, this business operator will be also referred to simply as a business operator) constructs and operates a business system for providing the service (hereinafter, this business system will be also referred to as an information processing system). When a failure occurs in the business system in operation, an operator of the business system (hereinafter, this operator will be also referred to simply as an operator) generates information on the occurred failure (hereinafter, this information will be also referred to as an incident). Specifically, the operator generates incidents including the name or the like (hereinafter also referred to simply as a material name) of a material acquired from the business system in order to examine the causes of the occurred failure.

In this way, the operator can shorten the time needed for examining the causes by referring to the accumulated incidents when a failure of the same content as the failure occurred in the past, for example, occurs again. Related technologies are disclosed, for example, in Japanese Laid-open Patent Publication Nos. 2003-345628, 2010-257066, 2015-153078, 2010-066841, and 2002-297796.

SUMMARY

Here, the incident is generated when an operator having detected an error message output in a business system inputs the incident, for example. Due to this, respective operators may input the same material name using different expressions and may input part of a material name in a wrong state. Moreover, the incident may include a material name which was not needed to be acquired to examine the causes of the occurred failure like a character string that "a material name having a material name of A is not needed for examining the cause of failure", for example.

Due to this, an operator is not able to acquire materials needed for examining the causes of failures efficiently when respective material names included in an incident are extracted.

According to an aspect of the embodiments, a non-transitory computer-readable storage medium storing therein a failure analysis program that causes a computer to execute a process includes: first extracting, for respective incidents, first material names that satisfy a first condition from character strings included in each incident; first calculating a combination of feature values corresponding respectively to one or more features from character strings correlated with the extracted first material names, for the respective incidents and for the respective first material names; second extracting, for the respective incidents, second material names, which are the same material names as the first material name, from the character strings included in each incident; second calculating a combination of feature values corresponding respectively to the one or more features from character strings correlated with the extracted second material names, for the respective incidents and for the respective second material names; specifying a specific combination that satisfies a second condition from the combinations of feature values corresponding to the respective material names, for the respective material names included in the first and second material names; and outputting, for the respective incidents, material names, in which the calculated combination of feature values is the same as the specific combination, among the material names included in the first and second material names.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 15 is a diagram illustrating a specific example of the incident information 131.

FIG. 19 is a diagram illustrating a specific example of the first feature value information 132.

FIG. 20 is a diagram illustrating a specific example of the second feature value information 133.

FIG. 21 illustrates a specific example of the cluster information 134.

FIG. 22 is a diagram illustrating a specific example of the cluster feature information 135.

FIG. 23 is a diagram illustrating a specific example of the material name information 136.

FIG. 28 is a diagram illustrating a specific example of the processes of S71 to S81.

FIG. 29 is a diagram illustrating a specific example of the processes of S71 to S81.

DESCRIPTION OF EMBODIMENTS

Configuration of Information Processing System

Figure 1:
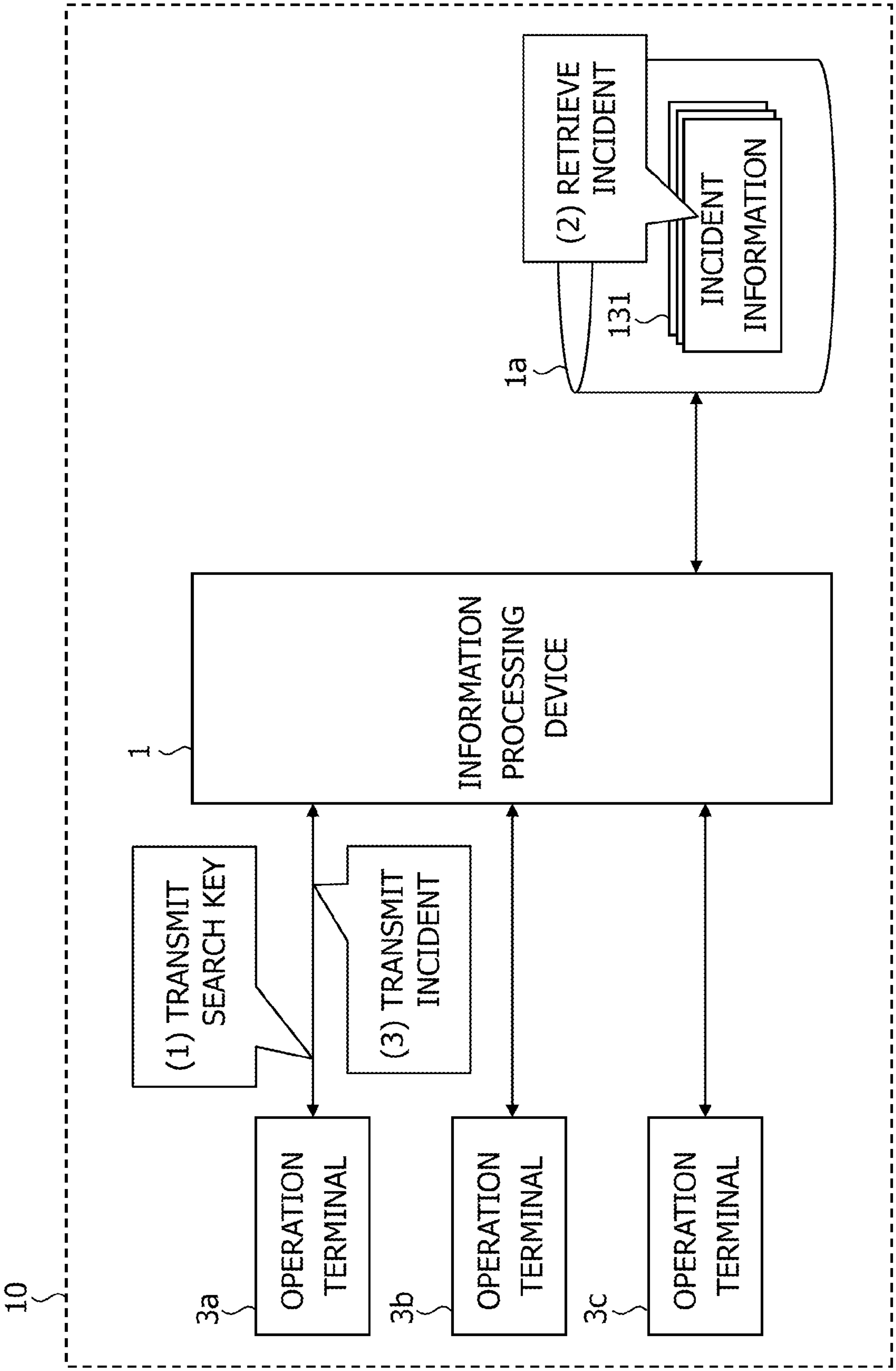
FIG. 1 is a diagram illustrating a configuration of the information processing system 10.
Figure 2:
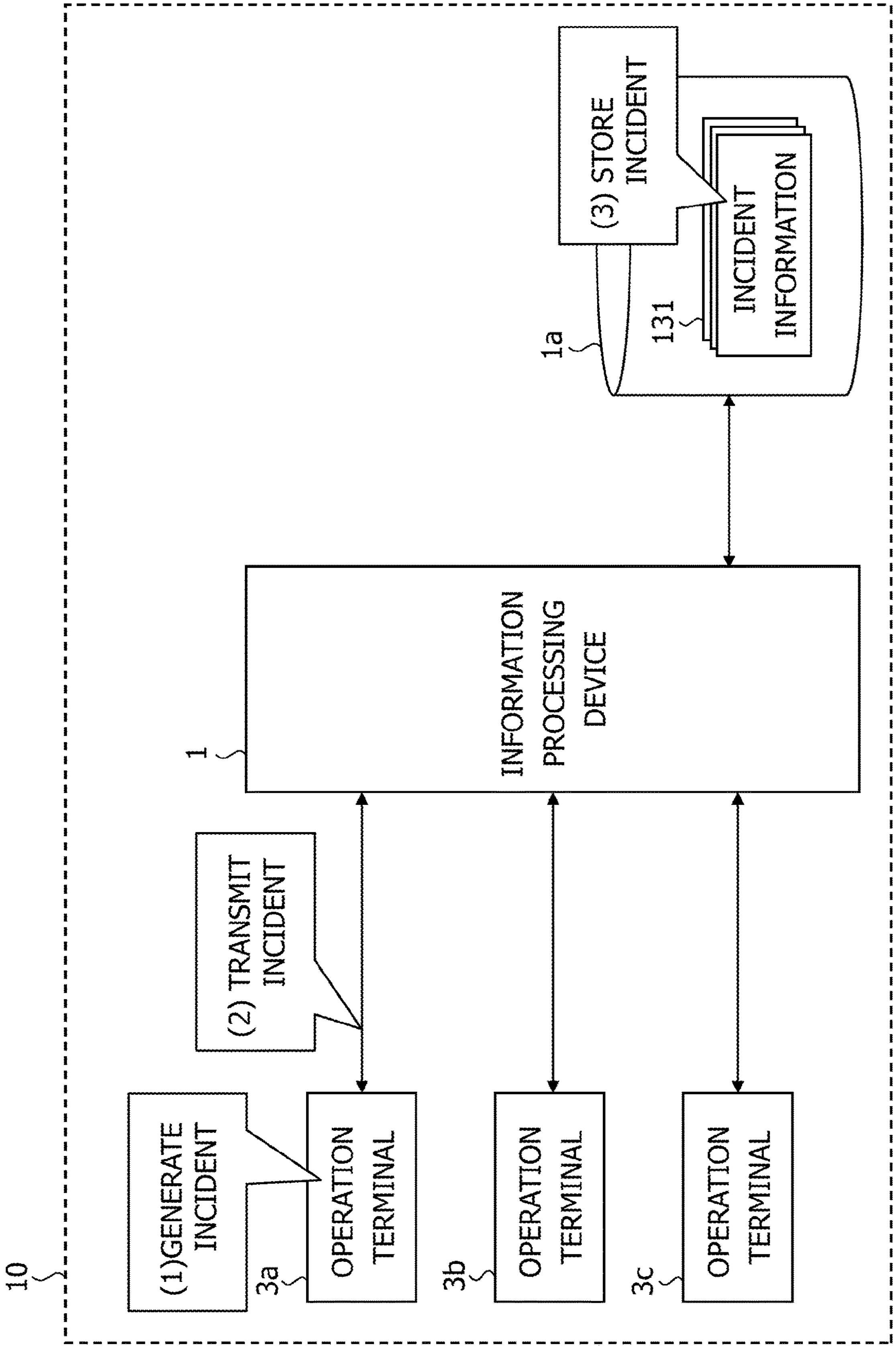
FIG. 2 is a diagram illustrating a configuration of the information processing system 10.

First, a configuration of an information processing system 10 will be described. FIGS. 1 and 2 are diagrams illustrating a configuration of the information processing system 10. The information processing system 10 illustrated in FIGS. 1 and 2 includes an information processing device 1 (a failure analysis device 1), a storage device 1*a*, and operation terminals 3*a*, 3*b*, and 3*c* (hereinafter these operation terminals will be also referred to collectively as an operation terminal 3).

For example, as illustrated in FIG. 1, an operator having detected an error message output from a business system (not illustrated) transmits a search key made up of character strings included in the detected error message to the information processing device 1 via the operation terminal 3 in order to specify a method for taking countermeasures for the detected error message (see (1) in FIG. 1). When a search key is received from the operation terminal 3, the information processing device 1 retrieves an incident corresponding to the search key from incident information 131 stored in the storage device 1*a* (see (2) in FIG. 1). After that, the information processing device 1 transmits the retrieved incident to the operation terminal 3 (see (3) in FIG. 1). In this way, the operator can specify an incident generated when the same error message as the newly detected error message was detected in the past.

The incident information 131 stored in the storage device 1*a* includes respective pieces of information generated until the operator takes countermeasures for the detected error message. Specifically, such an incident includes a sentence (a question sentence and an answer sentence) exchanged when the operator having detected an error message makes an inquiry to a person in other department (a developer or the like of the business system) and a material name of a material (for example, an executed command, a read file, or the like) acquired to examine an occurred event, for example.

After that, the operator specifies a material name included in the incident received from the information processing device 1. The operator accesses the business system (a business system that has output an error message) via the operation terminal 3 and acquires the specified material name. In this way, the operator can acquire the same material as the material acquired when the newly detected error message was detected in the past.

The operator generates a new incident on the basis of respective pieces of information generated until countermeasures for a newly detected error message are taken (see (1) in FIG. 2). The operator transmits the generated new incident to the information processing device 1 via the operation terminal 3 (see (2) in FIG. 2). After that, the information processing device 1 stores (accumulates) the received new incident in the information storage area 130 as part of the incident information 131 (see (3) in FIG. 2).

Here, the incident is generated when an operator inputs a sentence in the operation terminal 3, for example. Due to this, for example, when a plurality of operators generate incidents, respective operators may input the same material name using different expressions and may input part of a material name in a wrong state. Moreover, the incident may include a material name which was not needed to be acquired to examine the causes of the occurred failure like a character string that "a material name having a material name of A is not needed for examining the cause of failure".

Due to this, an operator is not able to acquire materials needed for examining the causes of failures efficiently when respective material names included in an incident are extracted.

Therefore, the information processing device 1 of the present embodiment extracts a material name (hereinafter also referred to as a first material name) that satisfies a first condition from character strings included in each incident for the respective incidents and calculates a combination of feature values corresponding to each of one or more features from character strings correlated with the first material names for the respective incidents and for the respective first material names. Moreover, the information processing device 1 extracts material names (hereinafter also referred to as second material names) which are the same material names as the first material name from the character strings included in each incident for the respective incidents and calculates a combination of feature values corresponding to each of one or more features from the character strings correlated with the second material names for the respective incidents and for the respective second material names.

After that, the information processing device 1 specifies a combination (hereinafter also referred to as a specific combination) of feature values that satisfy a second condition from the combination of feature values corresponding to each material name for the respective material names included in the first and second material names and outputs material names in which the combination of feature values is the same as the specific combination among the material names included in the first and second material names for the respective incidents.

That is, it can be determined that a character string which is included in the same row as a prompt character string in each incident and which is positioned after the prompt character string (for example, immediately after the prompt character string) is a material name (the first material name that satisfies the first condition) of a material that was actually acquired in the fault cause examination performed in the past.

Due to this, the information processing device 1 of the present embodiment extracts a character string positioned immediately after a prompt character string of an incident, for example, as the first material name needed for performing the present fault cause examination. Moreover, the information processing device 1 acquires the second material name having the same name as the extracted first material name from each incident again.

In this way, the information processing device 1 can extract material names which was actually acquired in the fault cause examination performed in the past from character strings which are not positioned immediately after the prompt character string as well as the character string positioned immediately after the prompt character string, for example. Therefore, the information processing device 1 can acquire all material names which are determined to have actually been acquired in the fault cause examination performed in the past.

The combinations of feature values corresponding to the material names are the same even when the same material name is included in a plurality of incidents if the purpose (for example, acquisition for fault cause examination) of being included in the incident is the same. Therefore, when a material name in which the combination of feature values is different from that of the greater part of other material names is included in the incident even if the material name is the same as the other material names, it can be determined that the material name is included in the incident for a purpose different from that of the greater part of other material names.

Due to this, the information processing device 1 specifies a specific combination which is a combination of the greater part of feature values among combinations of feature values corresponding to respective material names, for example, for the respective material names included in the first and second material names. The information processing device 1 specifies a material name in which the combination of feature values is the same as the specific combination among the material names included in the first and second material names for the respective incidents and outputs the specified material names.

In this way, the information processing device 1 can prevent the output of a material name (a material name of which the purpose of being included in the incident is different from other material names) which has not been acquired in the fault cause examination performed in the past among the material names included in the respective incidents. Therefore, the information processing device 1 can acquire materials needed for fault cause examination efficiently.

Hardware Configuration of Information Processing Device

Figure 3:
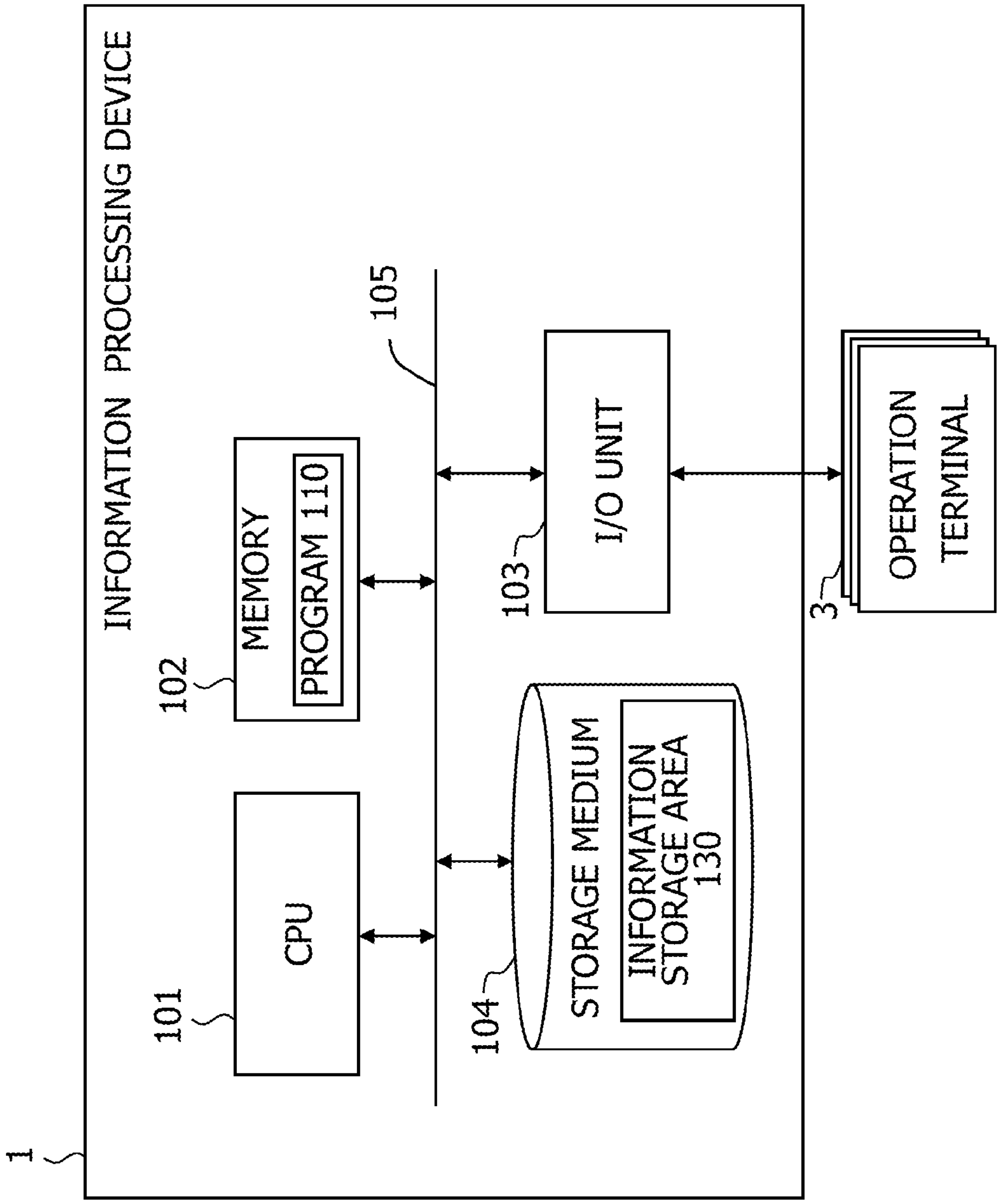
FIG. 3 is a diagram illustrating a hardware configuration of the information processing device 1.

Next, a hardware configuration of the information processing device 1 will be described. FIG. 3 is a diagram illustrating a hardware configuration of the information processing device 1.

The information processing device 1 includes a CPU 101 which is a processor, a memory 102, an external interface (an I/O unit) 103, and a storage medium (a storage) 104. The respective units are connected via a bus 105.

The storage medium 104 stores a program 110 for performing a process (hereinafter also referred to as a failure analysis process) of specifying a material name acquired in the fault cause examination performed in the past in a program storage area (not illustrated) in the storage medium 104.

As illustrated in FIG. 3, the CPU 101 loads the program 110 from the storage medium 104 into the memory 102 during execution of the program 110 and performs the failure analysis process in cooperation with the program 110.

The storage medium 104 has an information storage area 130 (hereinafter also referred to as a storage unit 130) in which information used when performing a failure analysis process, for example, is stored. Moreover, the external interface 103 performs communication with the operation terminal 3. The information storage area 130 corresponds to the storage device 1*a* described in FIG. 1 and the like, for example.

Software Configuration of Information Processing Device

Figure 4:
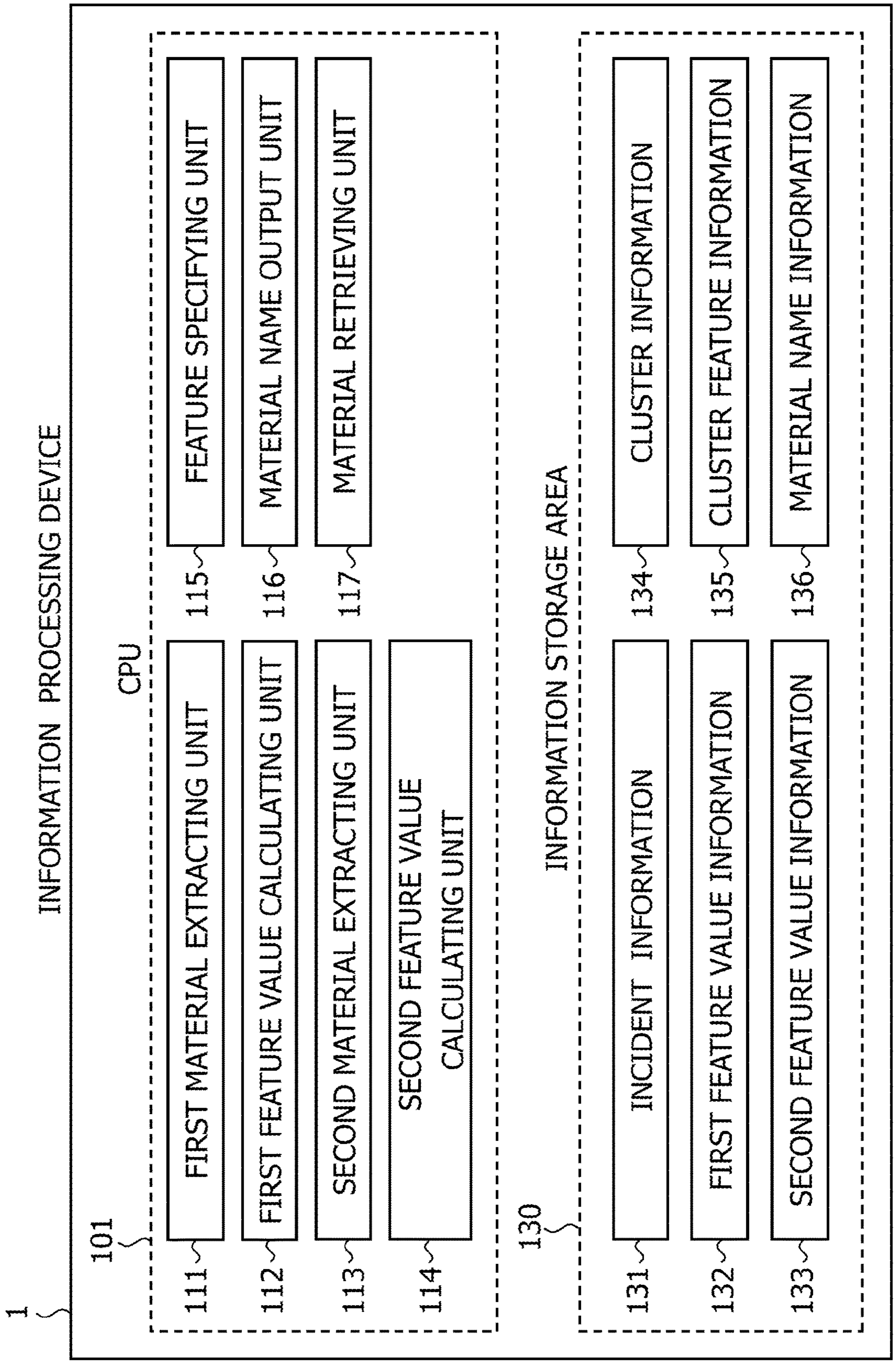
FIG. 4 is a functional block diagram of the information processing device 1.

Next, a software configuration of the information processing device 1 will be described. FIG. 4 is a functional block diagram of the information processing device 1. As illustrated in FIG. 4, the CPU 101 operates as a first material extracting unit 111, a first feature value calculating unit 112, a second material extracting unit 113, a second feature value calculating unit 114, a feature specifying unit 115, a material name output unit 116, and a material retrieving unit 117 by cooperating with the program 110.

As illustrated in FIG. 4, incident information 131, first feature value information 132, second feature value information 133, cluster information 134, cluster feature information 135, and material name information 136 are stored in the information storage area 130.

The first material extracting unit 111 extracts a first material name that satisfies a first condition from character strings included in each incident for the respective incidents included in the incident information 131 stored in the information storage area 130. Specifically, the first material extracting unit 111 extracts a character string positioned immediately after a specific character string (for example, a prompt character string) from the character strings included in each incident as the first material name, for example.

The first feature value calculating unit 112 calculates a combination (hereinafter also referred to as first feature value information 132) of feature values corresponding to each of one or more features from the character strings corresponding to the first material name for the respective incidents included in the incident information 131 and for the respective first material names.

The second material extracting unit 113 extracts a second material name which is the same material name as the first material name from the character strings included in each incident for the respective incidents included in the incident information 131.

The second feature value calculating unit 114 calculates a combination (hereinafter also referred to as second feature value information 133) of feature values corresponding to each of one or more features from the character strings correlated with the second material name for the respective incidents included in the incident information 131 and for the respective second material names.

The feature specifying unit 115 specifies a specific combination (hereinafter also referred to as cluster feature information 135) that satisfies a second condition from the combinations of feature values corresponding to each material name for the respective material names included in the first and second material names.

The material name output unit 116 outputs information (hereinafter also referred to as material name information 136) indicating a material name in which the combination of feature values is the same as the specific combination among the material names included in the first and second material names for the respective incidents.

The material retrieving unit 117 retrieves an incident including a predetermined search key from the incidents included in the incident information 131. The material retrieving unit 117 acquires a material corresponding to a material name included in the retrieved incident from the business system (for example, a business system that has output an error message). The cluster information 134 will be described later.

Outline of First Embodiment

Figure 5:
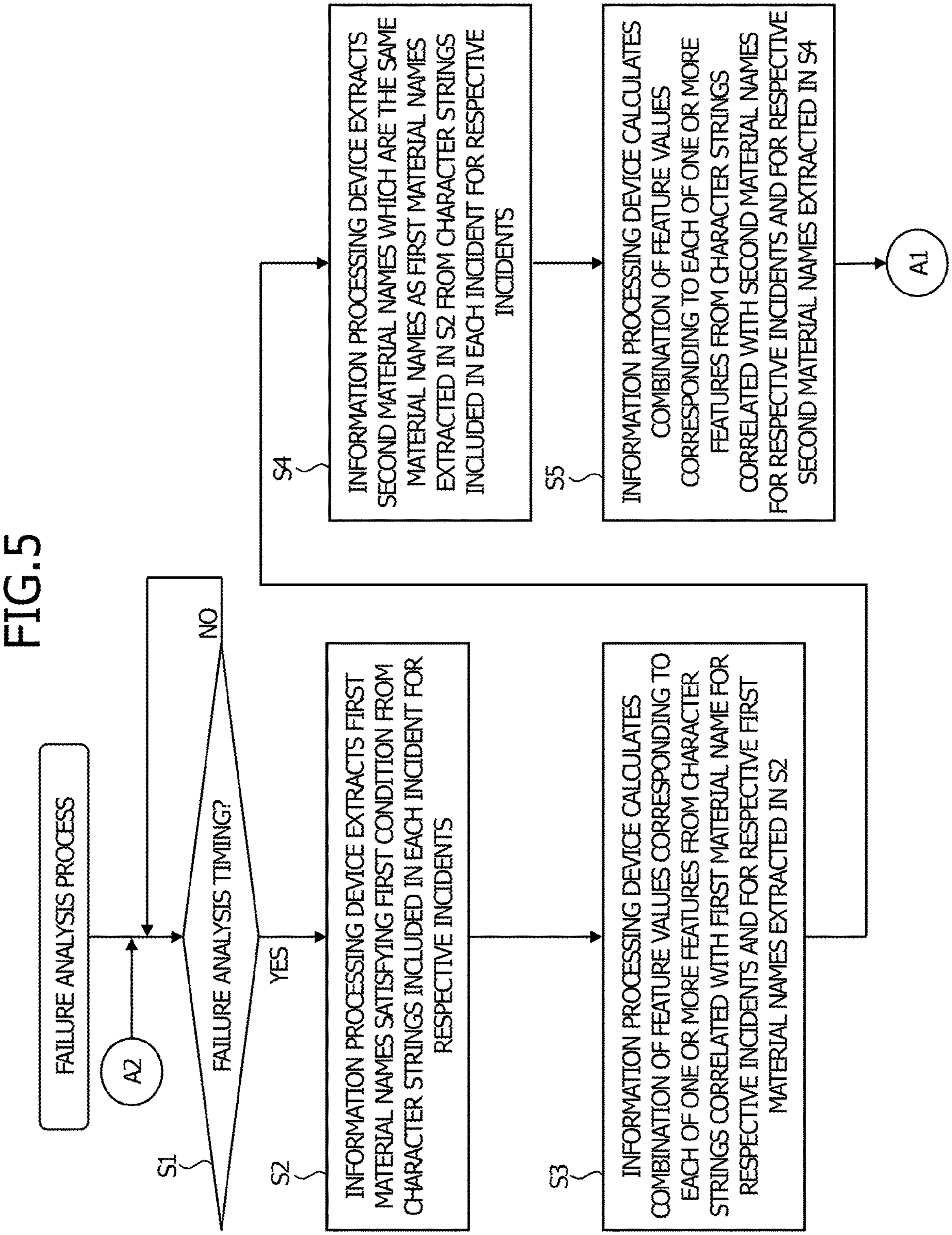
FIG. 5 is a flowchart illustrating an outline of a failure analysis process according to the first embodiment.
Figure 6:
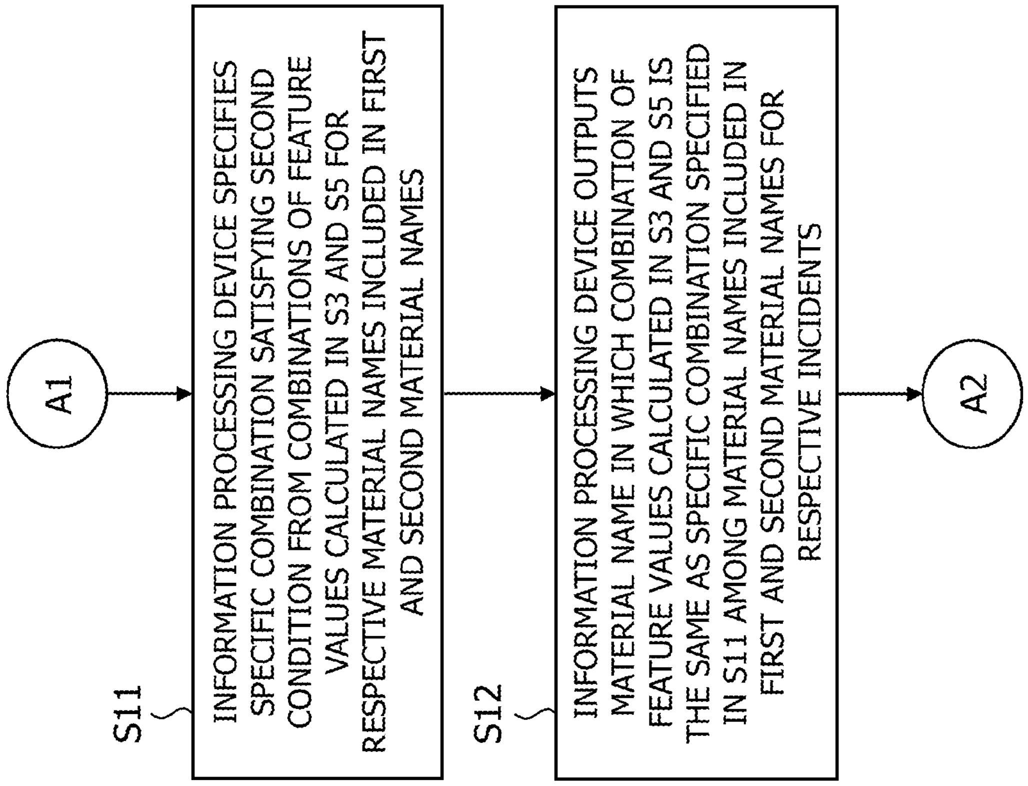
FIG. 6 is a flowchart illustrating an outline of a failure analysis process according to the first embodiment.
Figure 7:
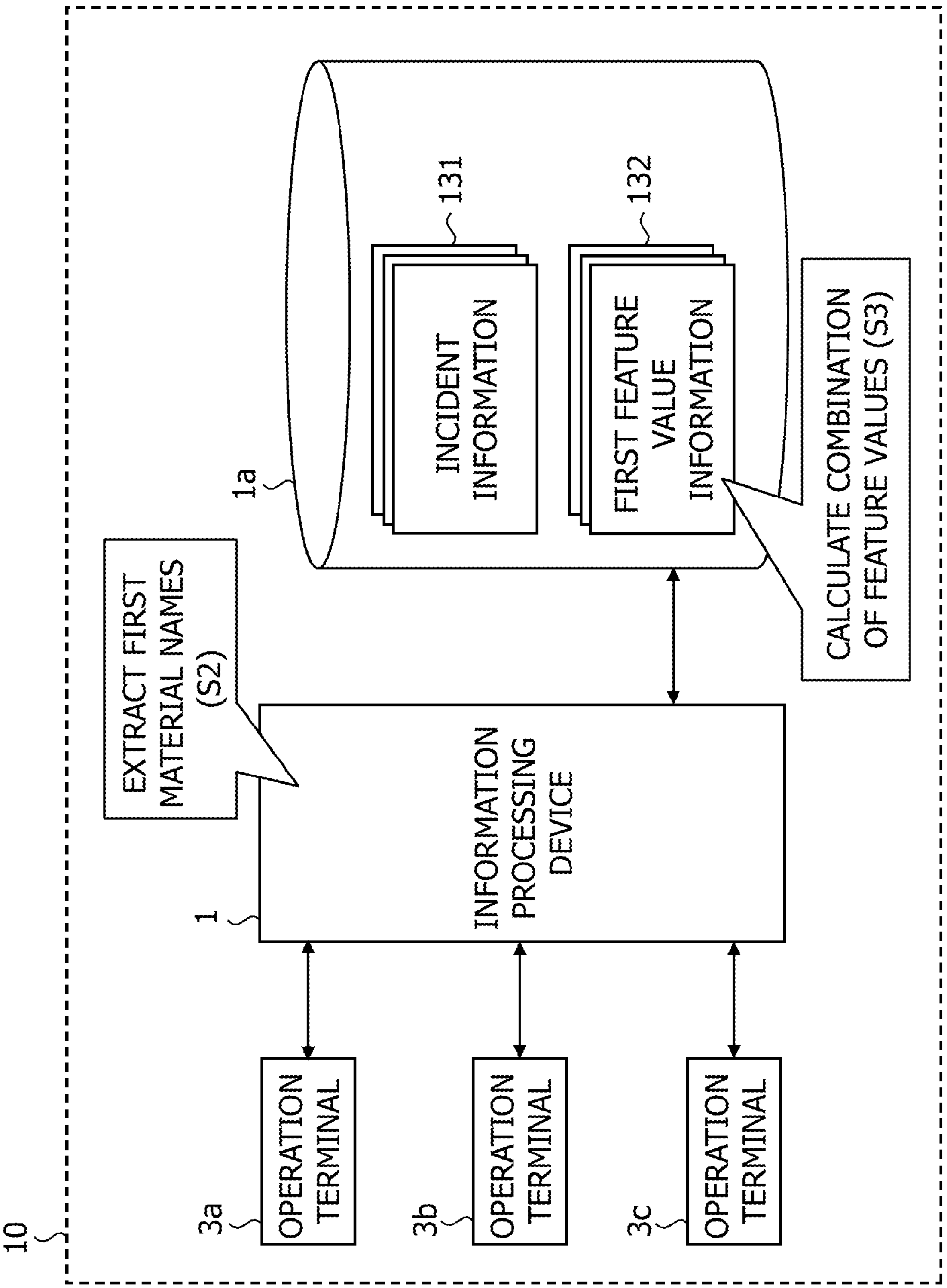
FIG. 7 is a diagram illustrating an outline of the failure analysis process according to the first embodiment.
Figure 8:
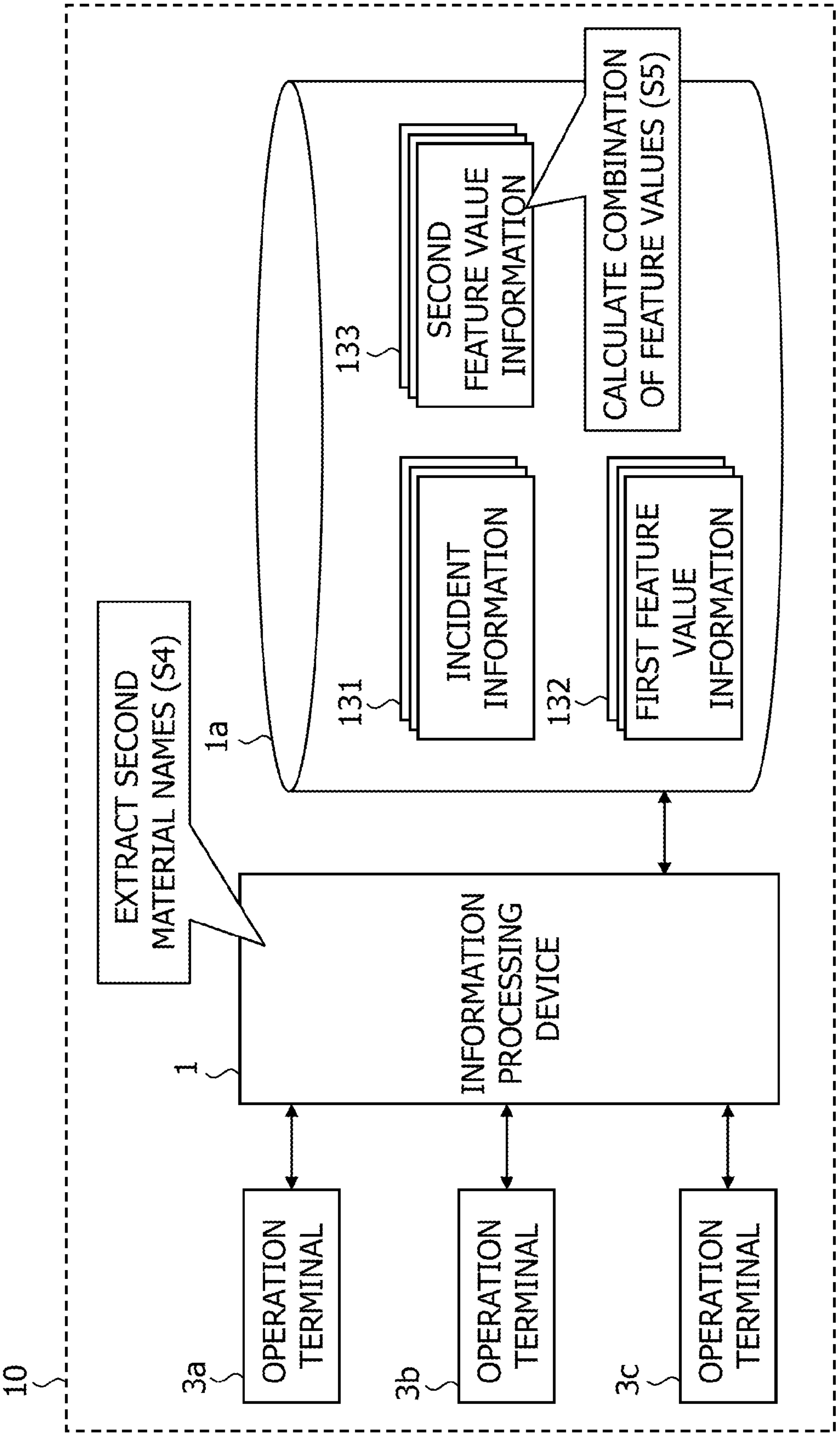
FIG. 8 is a diagram illustrating an outline of the failure analysis process according to the first embodiment.
Figure 9:
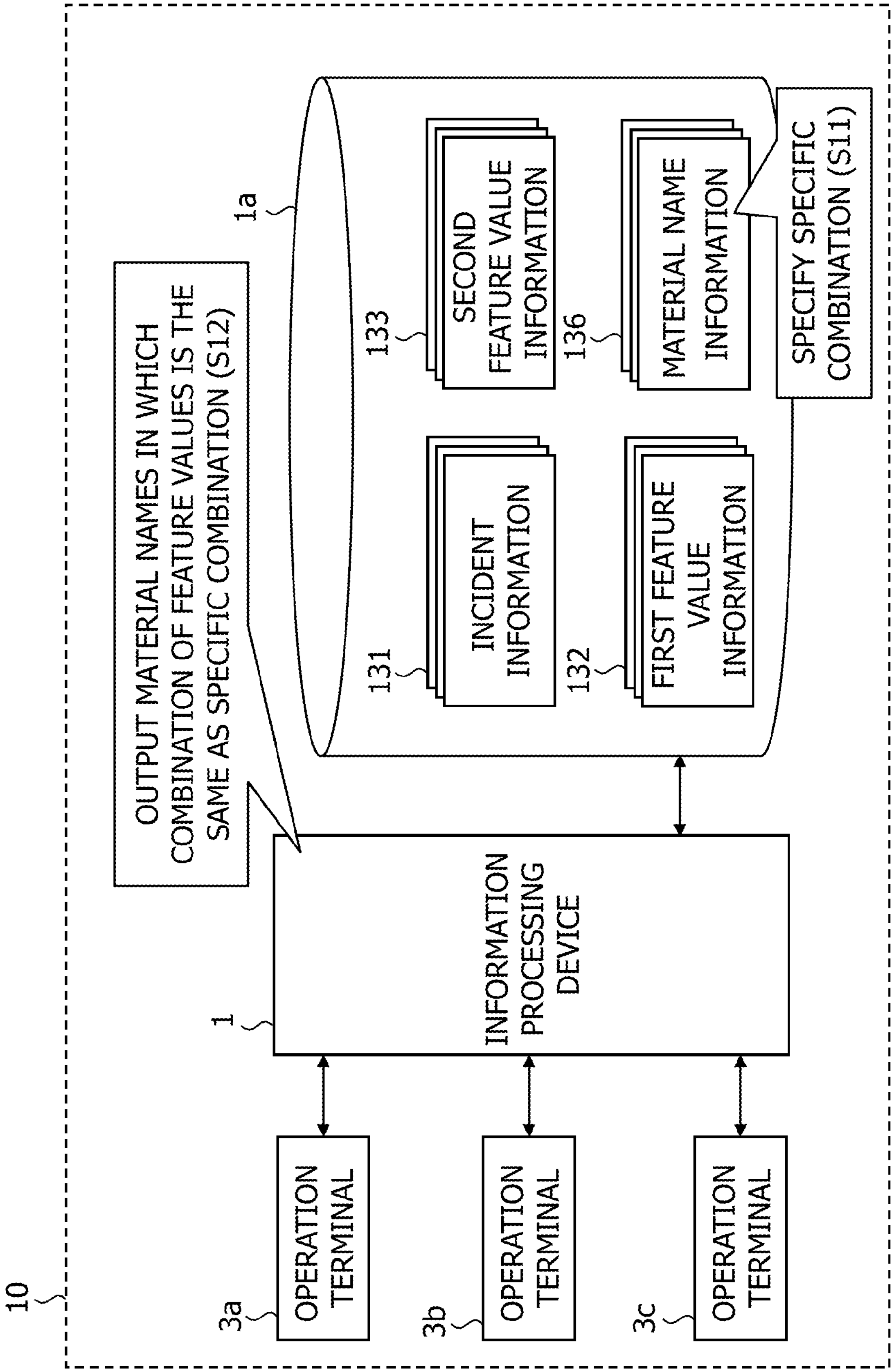
FIG. 9 is a diagram illustrating an outline of the failure analysis process according to the first embodiment.

Next, an outline of the first embodiment will be described. FIGS. 5 and 6 are flowchart illustrating an outline of a failure analysis process according to the first embodiment. FIGS. 7 to 9 are diagrams illustrating an outline of the failure analysis process according to the first embodiment. The failure analysis process illustrated in FIGS. 5 and 6 will be described with reference to FIGS. 7 to 9.

As illustrated in FIG. 5, the information processing device 1 waits until a failure analysis timing (S1: NO). The failure analysis timing may be a periodic timing such as once a day, for example. Moreover, the failure analysis timing may be a timing at which an operator inputs a statement that a failure analysis process is to be performed on the information processing device 1.

When the failure analysis timing is reached (S1: YES), as illustrated in FIG. 7, the information processing device 1 extracts a first material name that satisfies a first condition from character strings included in each incident for the respective incidents (S2). Subsequently, as illustrated in FIG. 7, the information processing device 1 calculates a combination of feature values corresponding to each of one or more features correlated with the first material name for the respective incidents and for the respective first material names extracted in the process of S2 (S3).

As illustrated in FIG. 8, the information processing device 1 extracts a second material name which is the same material name as the first material name extracted in S2 from the character strings included in each incident for the respective incidents (S4). Specifically, the information processing device 1 extracts a material name which is the same as the first material name and which is other than the first material name extracted in the process of S2 as the second material name, for example. As illustrated in FIG. 8, the information processing device 1 calculates a combination of feature values corresponding to each of one or more features from the character strings correlated with the second material name for the respective incidents and for the respective second material names extracted in the process of S4 (S5).

That is, it can be determined that a character string positioned immediately after the prompt character string among character strings included in each incident is a material name (the first material name that satisfies the first condition) of a material that was actually acquired in the fault cause examination performed in the past.

Due to this, the information processing device 1 of the present embodiment extracts a character string positioned immediately after a prompt character string of an incident, for example, as the first material name needed for performing the present fault cause examination. Moreover, the information processing device 1 acquires the second material name having the same name as the extracted first material name from each incident again.

In this way, the information processing device 1 can extract material names which was actually acquired in the fault cause examination performed in the past from character strings which are not positioned immediately after the prompt character string as well as the character string positioned immediately after the prompt character string, for example. Therefore, the information processing device 1 can acquire all material names which are determined to have actually been acquired in the fault cause examination performed in the past.

Subsequently, as illustrated in FIGS. 6 and 9, the information processing device 1 specifies a specific combination that satisfies a second condition from the combinations of feature values calculated in the process of S3 and S5 for the respective material names included in the first and second material names (S11). As illustrated in FIG. 9, the information processing device 1 outputs a material name in which the combination of the feature value calculated in the processes of S3 and S5 is the same as the specific combination specified in the process of S11 among the material names included in the first and second material names for the respective incidents (S12). After that, the information processing device 1 waits until the next failure analysis timing (S1: NO).

That is, the combinations of feature values corresponding to the material names are the same even when the same material name is included in a plurality of incidents if the purpose (for example, acquisition for fault cause examination) of being included in the incident is the same. Therefore, when a material name in which the combination of feature values is different from that of more than half of other material names is included in the incident even if the material name is the same as the other material names, it can be determined that the material name is included in the incident for a purpose different from that of more than half of other material names.

Due to this, the information processing device 1 specifies a specific combination which is a combination of the greater part of feature values among combinations of feature values corresponding to respective material names, for example, for the respective first and second material names. The information processing device 1 specifies a material name in which the combination of feature values is the same as the specific combination among the first and second material names for the respective incidents and outputs the specified material names.

In this way, the information processing device 1 can prevent the output of a material name (a material name of which the purpose of being included in the incident is different from other material names) which has not been acquired in the fault cause examination performed in the past among the material names included in the respective incidents. Therefore, the information processing device 1 can acquire materials needed for fault cause examination efficiently.

In the process of S5, the information processing device 1 may calculate a combination of feature values corresponding to the first material name as well as calculating a combination of feature values corresponding to the second material name. In this way, the information processing device 1 can omit the process of S3 and can collectively perform the process of calculating the combinations of feature values corresponding to respective material names.

Details of First Embodiment

Next, the details of the first embodiment will be described. FIGS. 10 to 13 are flowchart illustrating the details of the failure analysis process according to the first embodiment. FIGS. 14 to 23 are diagrams illustrating the details of the failure analysis process according to the first embodiment. The failure analysis process illustrated in FIGS. 10 to 13 will be described with reference to FIGS. 14 to 23.

Figure 10:
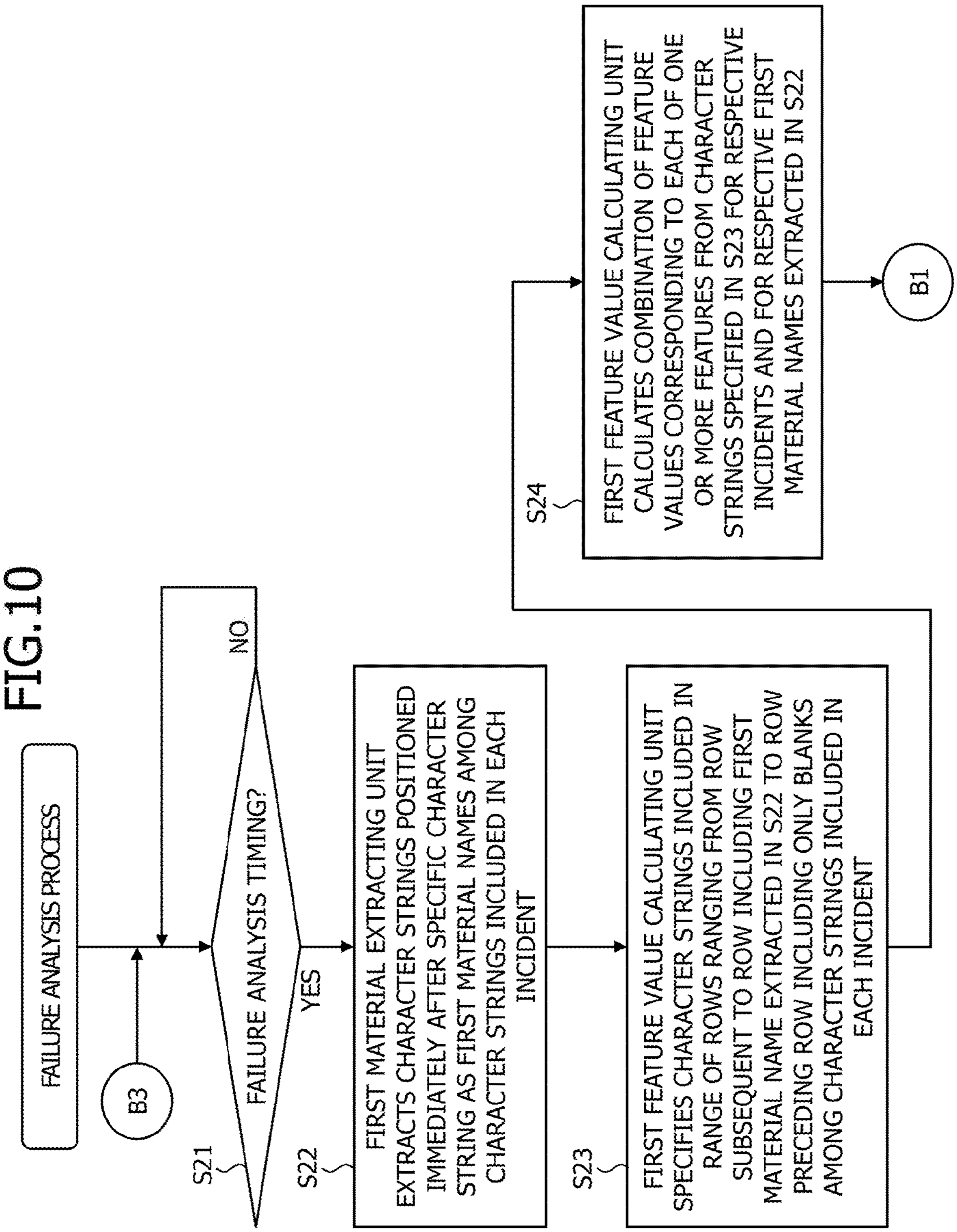
FIG. 10 is a flowchart illustrating the details of the failure analysis process according to the first embodiment.
Figure 11:
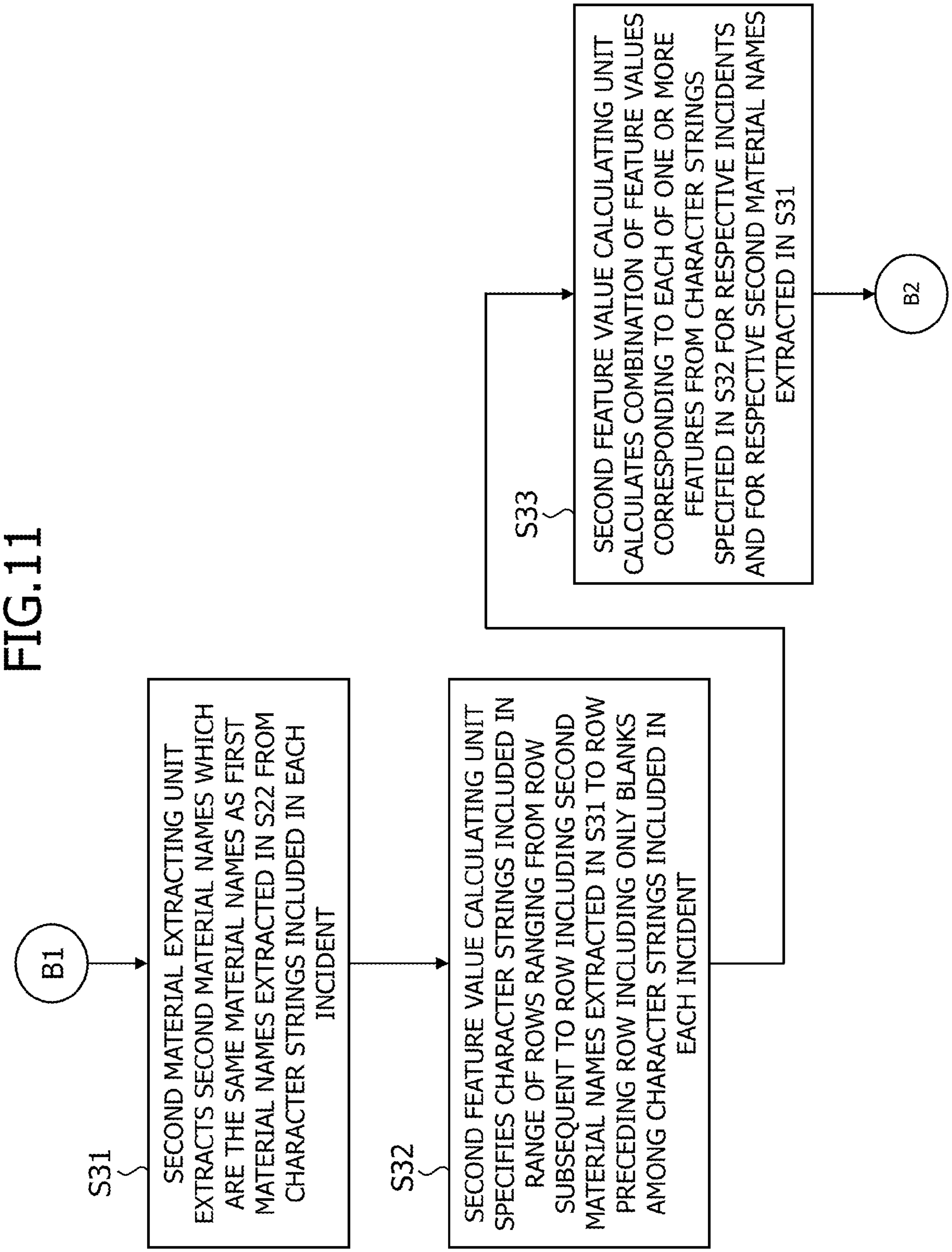
FIG. 11 is a flowchart illustrating the details of the failure analysis process according to the first embodiment.
Figure 12:
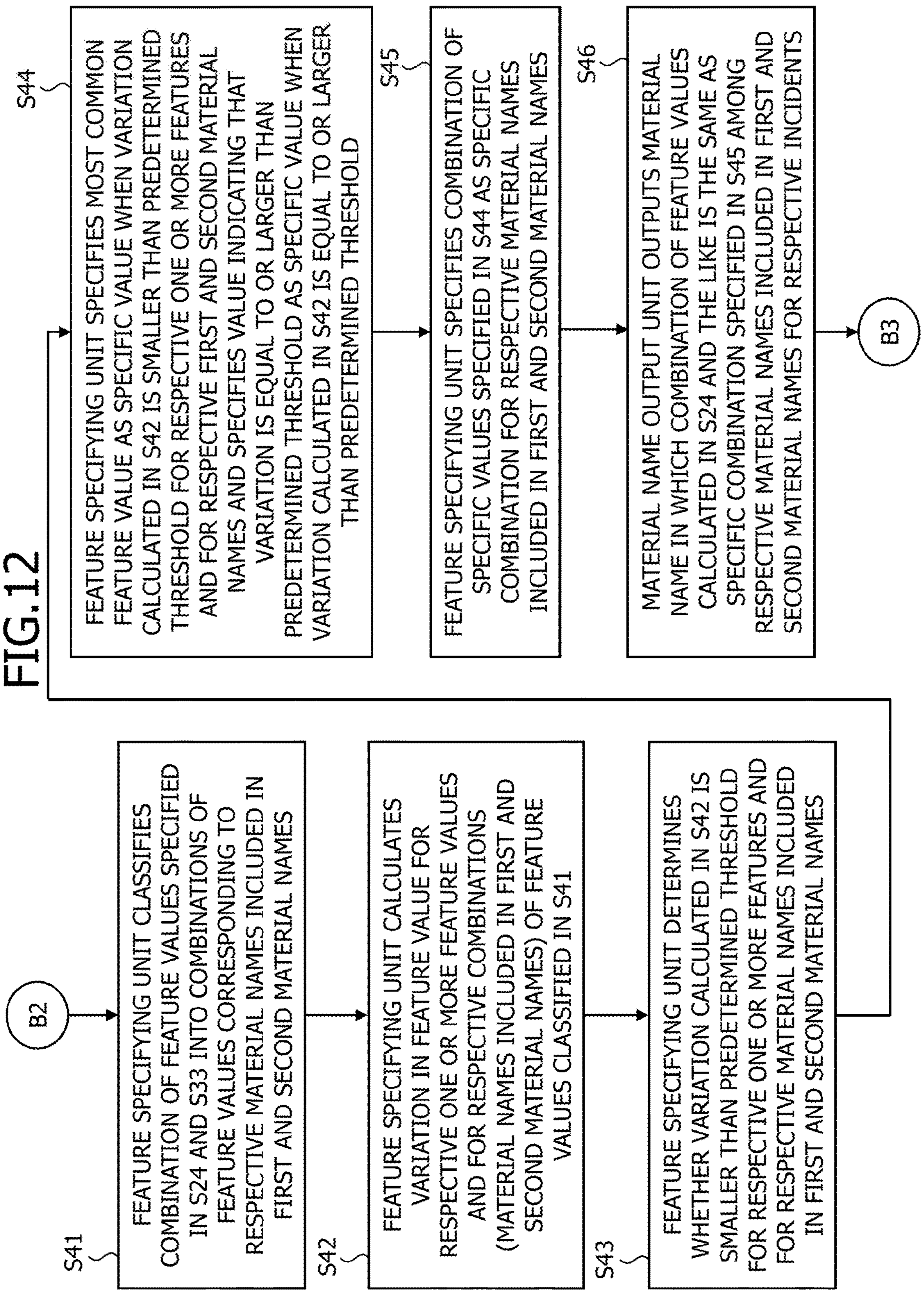
FIG. 12 is a flowchart illustrating the details of the failure analysis process according to the first embodiment.

As illustrated in FIG. 10, the first material extracting unit 111 of the information processing device 1 waits until a failure analysis timing (S21: NO).

When the failure analysis timing is reached (S21: YES), the first material extracting unit 111 extracts each of character strings positioned immediately after a specific character string among character strings in each incident included in the incident information 131 stored in the information storage area 130, for example, as the first material name (S22). Specifically, the first material extracting unit 111 extracts each of character strings positioned immediately after the prompt character string, for example, as the first material name. The first material extracting unit 111 may extracts the first material name only from the character strings positioned immediately after the prompt character string using a regular expression, for example.

After that, the first feature value calculating unit 112 of the information processing device 1 specifies a character string included in a range of rows ranging from a row subsequent to a row including the first material name extracted in the process of S22 to a row preceding a row including only blanks among the character strings in each incident included in each of the pieces of incident information 131 (S23). Hereinafter, a specific example of the incident information 131 will be described.

Specific Example of Incident Information

Figure 14:
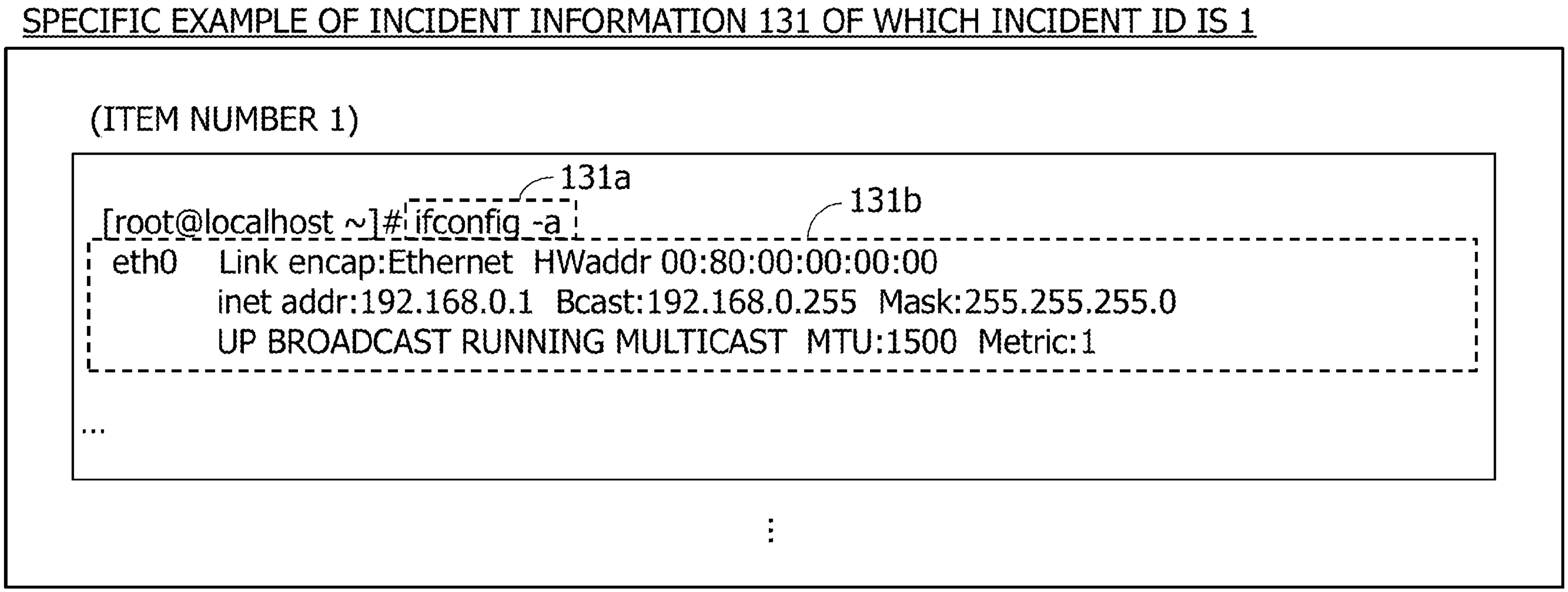
FIG. 14 is a diagram illustrating a specific example of the incident information 131.
Figure 16:
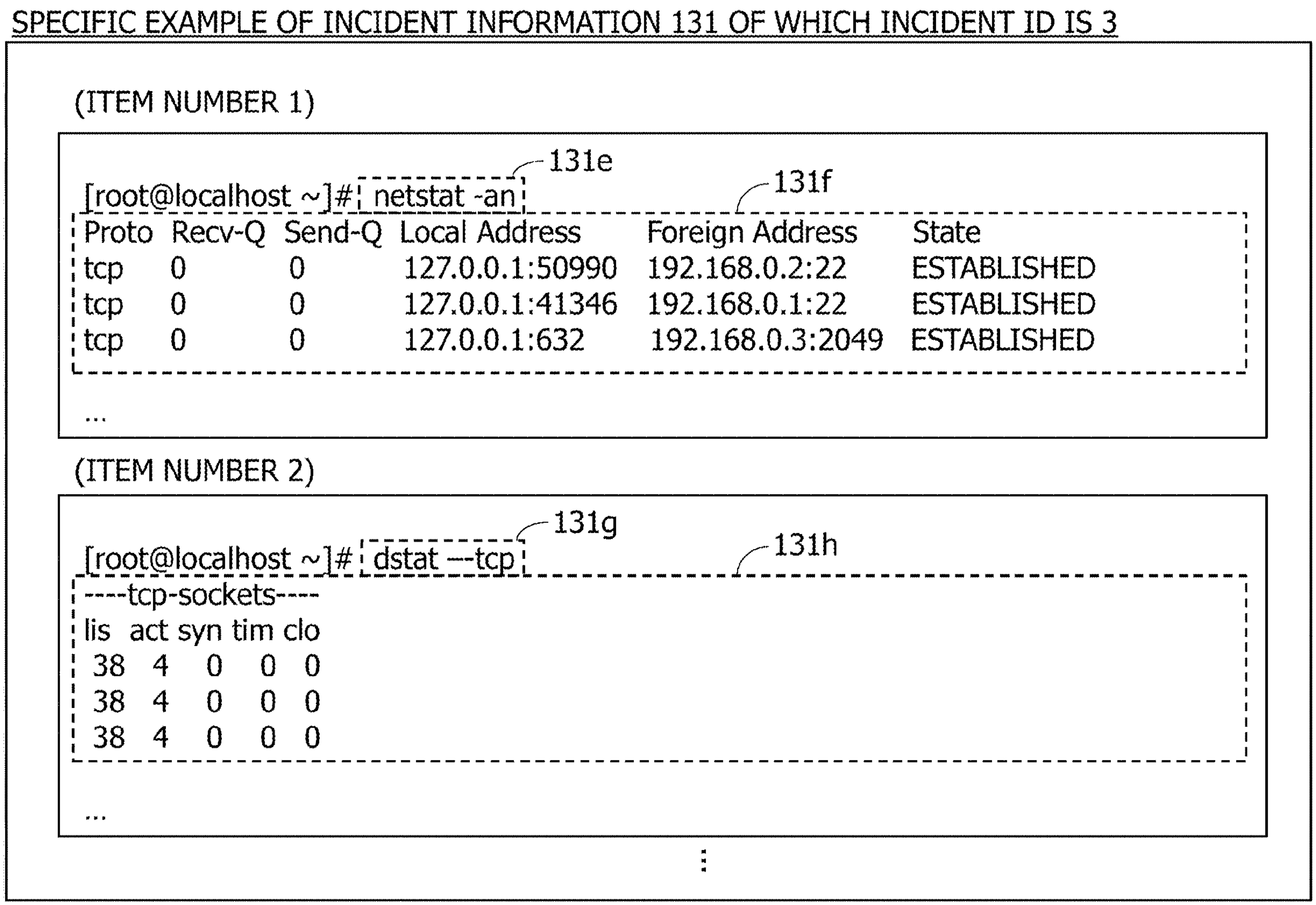
FIG. 16 is a diagram illustrating a specific example of the incident information 131.
Figure 17:
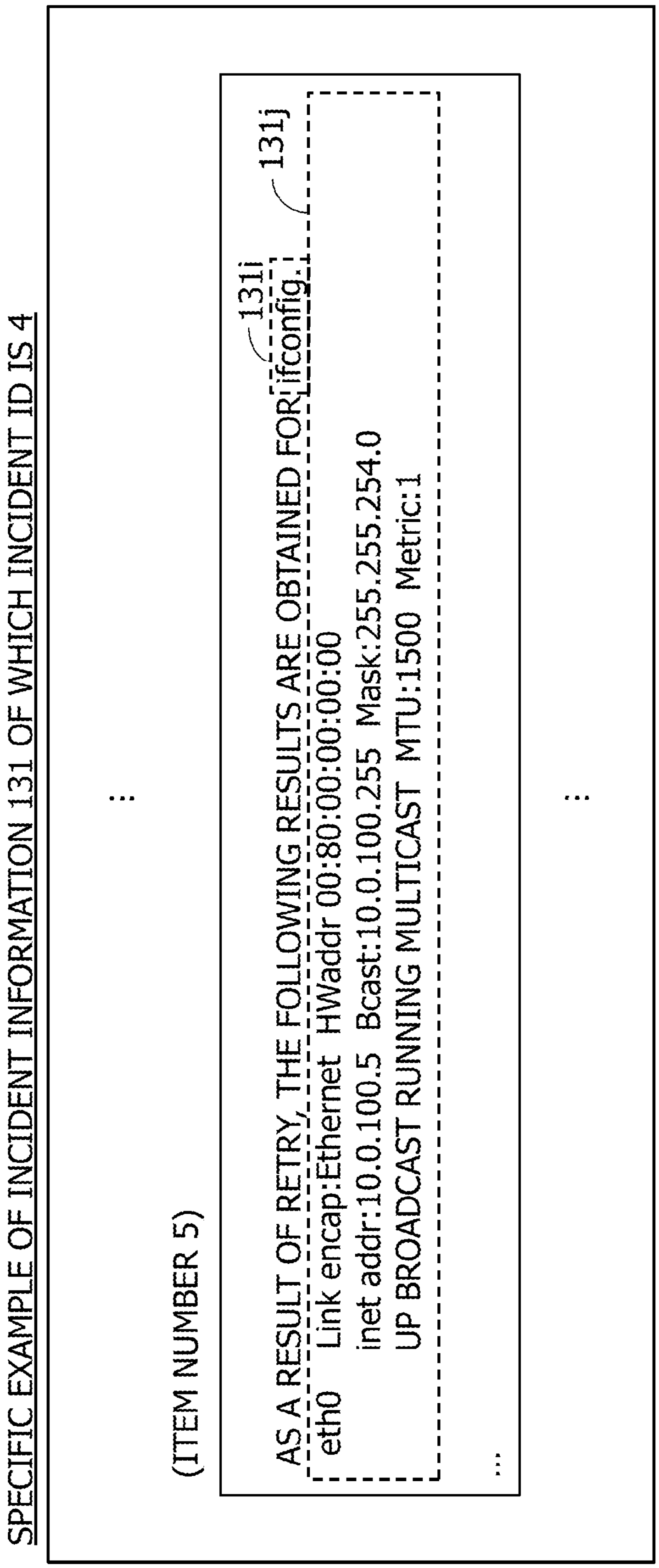
FIG. 17 is a diagram illustrating a specific example of the incident information 131.
Figure 18:
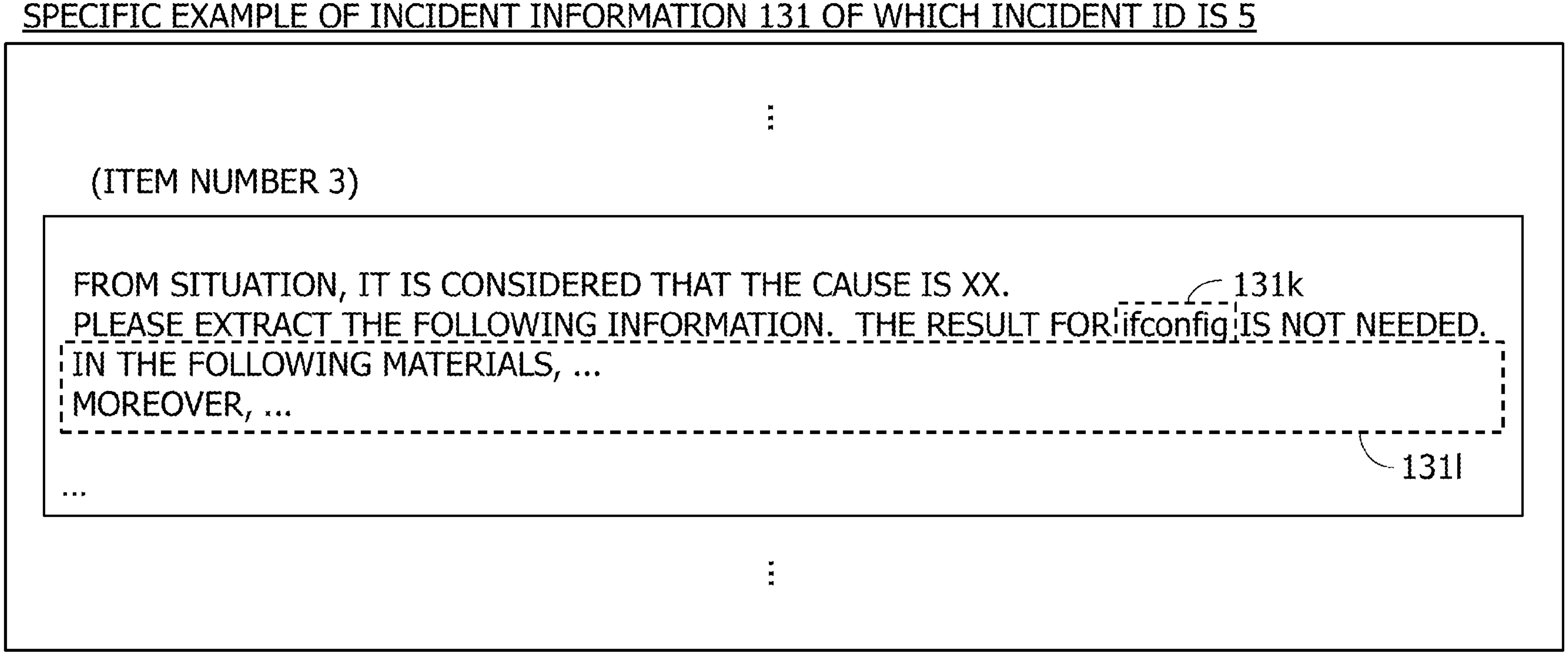
FIG. 18 is a diagram illustrating a specific example of the incident information 131.

FIGS. 14 to 18 are diagrams illustrating a specific example of the incident information 131. The incident information 131 illustrated in FIGS. 14 and 15 illustrates item number 1 only, the incident information 131 illustrated in FIG. 16 illustrates item numbers 1 and 2 only, the incident information 131 illustrated in FIG. 17 illustrates item number 5 only, and the incident information 131 illustrated in FIG. 18 illustrates item number 3 only. Moreover, the respective item numbers included in the incident information 131 are separated into respective character strings having high relevance by the operator who has generated an incident, for example. Hereinafter, it will be assumed that incident IDs of the pieces of incident information 131 illustrated in FIGS. 14 to 18 are 1 to 5, respectively.

In item number 1 of the incident information 131 illustrated in FIG. 14, a character string 131*a* of "ifconfig -a" is described immediately after the prompt. Due to this, in this case, in the process of S22, the first material extracting unit 111 specifies "ifconfig" extracted using a regular expression as the first material name. In the process of S23, the first material extracting unit 111 specifies a character string 131*b* which is a character string included in a range of rows ranging from a row subsequent to a row including the character string 131*a* to a row preceding a row including only blanks.

In item number 1 of the incident information 131 illustrated in FIG. 15, a character string 131*c* of "cat/var/log/massages" is described immediately after the prompt. Due to this, in this case, in the process of S22, the first material extracting unit 111 specifies "/var/log/massages" extracted using a regular expression as the first material name. In the process of S23, the first material extracting unit 111 specifies a character string 131*d* which is a character string included in a range of rows ranging from a row subsequent to a row including the character string 131*c* to a row preceding a row including only blanks.

In item number 1 of the incident information 131 illustrated in FIG. 16, a character string 131*e* of "netstat -an" is described immediately after the prompt. Due to this, in this case, in the process of S22, the first material extracting unit 111 specifies "netstat" extracted using a regular expression as the first material name. In the process of S23, the first material extracting unit 111 specifies a character string 131*f* which is a character string included in a range of rows ranging from a row subsequent to a row including the character string 131*e* to a row preceding a row including only blanks.

In item number 2 of the incident information 131 illustrated in FIG. 16, a character string 131*g* of "dstat --tcp" is described immediately after the prompt. Due to this, in this case, in the process of S22, the first material extracting unit 111 specifies "dstat" extracted using a regular expression as the first material name. In the process of S23, the first material extracting unit 111 specifies a character string 131*h* which is a character string included in a range of rows ranging from a row subsequent to a row including the character string 131*g* to a row preceding a row including only blanks.

Returning to FIG. 10, the first feature value calculating unit 112 calculates a combination of feature values corresponding to each of one or more features from the character string specified in the process of S23 for the respective incidents and for the respective first material names extracted in the process of S22 (S24). Specifically, the first feature value calculating unit 112 generates first feature value information 132 including a combination of feature values corresponding to each of one or more features from the character string specified in the process of S23. The details of the process of S24 will be described later.

Details of Process of S24

In the process of S24, the first feature value calculating unit 112 uses a feature that "the character string specified in the process of S23 includes a character string separated by a specific character (for example, "=" or ":")" and a feature that "the character string specified by the process of S23 includes a time point" as one or more features, for example. Moreover, in the process of S24, the first feature value calculating unit 112 uses a feature that "the character string specified in the process S23 is described in a table form" and a feature that "a character string other than an item number among the character strings specified in the process of S23 includes numbers only" as one or more features, for example.

Specifically, in item number 1 of the incident information 131 illustrated in FIG. 14, the character string 131*b* includes "addr:192.168.0.1" which is a character string separated by":", for example. On the other hand, the character string 131*b* does not include a time point and is not described in a table form, and a character string other than an item number includes characters other than numbers. Due to this, in this case, the first feature value calculating unit 112 specifies "YES" (hereinafter also denoted simply by Y) as a feature value (hereinafter also referred to simply as a setting value) corresponding to the feature that "the character string specified in the process of S23 includes a character string separated by a specific character". Moreover, the first feature value calculating unit 112 specifies "NO" (hereinafter also denoted simply by N) as a feature value (hereinafter also referred to simply as a time point) corresponding to the feature that "the character string specified in the process of S23 includes a time point". Furthermore, the first feature value calculating unit 112 specifies "N" as a feature value (hereinafter also referred to simply as table form information) corresponding to the feature that "the character string specified in the process of S23 is described in a table form". Furthermore, the first feature value calculating unit 112 specifies "N" as a feature value (hereinafter also referred to simply as a numerical value) corresponding to the feature that "a character string other than an item number among the character strings specified in the process of S23 includes numbers only".

In item number 1 of the incident information 131 illustrated in FIG. 15, the character string 131*d* includes a character string of "11:59:55" which is a character string (a time point) separated by ":", for example. On the other hand, the character string 131*b* is not described in a table form and a character string other than an item number includes characters other than numbers. Due to this, in this case, the first feature value calculating unit 112 specifies "Y" as the setting value, specifies "Y" as the time point, specifies "N" as the table form information, and specifies "N" as the numerical value.

In item number 1 of the incident information 131 illustrated in FIG. 16, the character string 131*f* includes "127.0.0.1:50990" which is a character string including ":", for example, and is described in a table form. On the other hand, the character string 131*f* does not include a time point, and a character string other than an item number includes characters other than numbers. Due to this, in this case, the first feature value calculating unit 112 specifies "Y" as the setting value, specifies "N" as the time point, specifies "Y" as the table form information, and specifies "N" as the numerical value.

In item number 2 of the incident information 131 illustrated in FIG. 16, the character string 131*h* is described in a table form, and a character string other than an item number includes numbers only, for example. On the other hand, the character string 131*h* does not include a character string separated by a specific character and includes a time point. Due to this, in this case, the first feature value calculating unit 112 specifies "N" as the setting value, specifies "N" as the time point, specifies "Y" as the table form information, and specifies "Y" as the numerical value. Hereinafter, a specific example of the first feature value information 132 generated in the process of S24 will be described.

Specific Example of First Feature Value Information

FIG. 19 is a diagram illustrating a specific example of the first feature value information 132. The items of the first feature value information 132 illustrated in FIG. 19 include "ID" for specifying respective pieces of information included in the first feature value information 132, "incident ID" for identifying respective incidents included in the incident information 131, and "item number" for specifying an item number included in each incident. Moreover, the items of the first feature value information 132 illustrated in FIG. 19 include "material name" in which a material name is set, "setting value" in which a setting value is set, "time point" in which a time point is set, "table form" in which table form information is set, and "numerical value" in which a numerical value is set.

Specifically, the first material name extracted from item number 1 of the incident information 131 (the incident information 131 of which the incident ID is 1) illustrated in FIG. 14 is "ifconfig". Moreover, the setting value, the time point, the table form information, and the numerical value corresponding to "ifconfig" are "Y", "N", "N", and "N", respectively. Due to this, the first feature value calculating unit 112 sets "1" as the "incident ID", sets "1" as the "item number", and sets "ifconfig" as the "material name" like the information of which the "ID" is "1" in FIG. 19. Furthermore, the first feature value calculating unit 112 sets "Y" as the "setting value", sets "N" as the "time point", sets "N" as the "table form", and sets "N" as the "numerical value" like the information of which the "ID" is "1" in FIG. 19. Description of other information included in FIG. 19 will be omitted.

Returning to FIG. 11, the second material extracting unit 113 of the information processing device 1 extracts the second material name which is the same material name as the first material name extracted in the process of S22 from the character string in each incident included in the incident information 131 stored in the information storage area 130 (S31).

That is, the second material extracting unit 113 extracts the second material name which is a material name which is not positioned immediately after a specific character string and which is the same material name as the first material name, for example. Specifically, as illustrated in FIG. 17, the second material extracting unit 113 specifies a character string 131*i* which is a material name which is not positioned immediately after a specific character string and which is the same material name as the extracted first material name as the second material name.

In this way, the information processing device 1 can extracts a material name which was actually acquired in the fault cause examination performed in the past from a character string which is not positioned immediately after a prompt character string as well as a character string positioned immediately after the prompt character string, for example.

After that, the second feature value calculating unit 114 of the information processing device 1 specifies a character string included in a range of rows ranging from a row subsequent to a row including the second material name extracted in the process of S31 to a row preceding a row including only blanks among the character strings in each incident included in the respective pieces of incident information 131 (S32). Specifically, as illustrated in FIG. 17, the second feature value calculating unit 114 specifies a character string 131*j* which is a character string included in a range of rows ranging from a row subsequent to a row including the character string 131*i*.

The second feature value calculating unit 114 calculates a combination of feature values corresponding to each of one or more features from the character string specified in the process of S32 for the respective incidents and for the respective second material names extracted in the process of S31 (S33). Specifically, the second feature value calculating unit 114 generates the second feature value information 133 including a combination of feature values corresponding to each of one or more features from the character string specified in the process of S32. Hereinafter, a specific example of the second feature value information 133 will be described.

Specific Example of Second Feature Value Information

FIG. 20 is a diagram illustrating a specific example of the second feature value information 133. The second feature value information 133 illustrated in FIG. 20 has the same items as those of the first feature value information 132 described in FIG. 19. Moreover, the second feature value information 133 illustrated in FIG. 20 includes respective pieces of information included in the first feature value information 132 described in FIG. 19.

Specifically, the first material name extracted from item number 5 of the incident information 131 (the incident information 131 of which the incident ID is 4) illustrated in FIG. 17 is "ifconfig", and the setting value, the time point, the table form information, and the numerical value of a character string corresponding to "ifconfig" are "Y", "N", "N", and "N", respectively. Due to this, the first feature value calculating unit 112 sets "4" as the "incident ID", sets "5" as the "item number", and sets "ifconfig" as the "material name" like the information of which the "ID" is "8" in FIG. 20. Furthermore, the first feature value calculating unit 112 sets "Y" as the "setting value", sets "N" as the "time point", sets "N" as the "table form", and sets "N" as the "numerical value" like the information of which the "ID" is "8" in FIG. 20. Description of other information included in FIG. 20 will be omitted.

In the process of S32, the information processing device 1 may specify a character string corresponding to the first material name as well as specifying a character string corresponding to the second material name. In this case, in the process of S33, the information processing device 1 may calculate a combination of feature values corresponding to the first material name as well as the combination of feature values corresponding to the second material name. In this way, the information processing device 1 can omit the processes of S23 and S24 and can collectively perform a process of specifying the character string corresponding to each material name and calculating a combination of the feature value corresponding to each material name.

Returning to FIG. 12, the feature specifying unit 115 of the information processing device 1 classifies the combination of feature values specified in the processes of S24 and S33 into respective combinations of feature values corresponding to the respective material names (S41). Specifically, the feature specifying unit 115 generates the cluster information 134 that classifies the combination of feature values specified in the processes of S33 into respective combinations of feature values corresponding to the respective material names included in the first and second material names. Hereinafter, a specific example of the cluster information 134 will be described.

Specific Example of Cluster Information

FIG. 21 illustrates a specific example of the cluster information 134. Specifically, FIG. 21 illustrates the cluster information 134 classified for the information of which the "material name" is "ifconfig" among the pieces of second feature value information 133 described in FIG. 20.

The items of the cluster information 134 illustrated in FIG. 21 includes "ID" for identifying respective pieces of information included in the cluster information 134, "material name" in which a material name is set, and "setting value" in which a setting value is set. Moreover, the items of the cluster information 134 illustrated in FIG. 21 includes "time point" in which a time point is set, "table form" in which table form information is set, and "numerical value" in which a numerical value is set.

Specifically, pieces of information corresponding to the "material name", the "setting value", the "time point", the "table form" and the "numerical value" of the information of which the "IDs" in the second feature value information 133 described in FIG. 20 are "1", "3", "4", "8", "9", and "11" are set to the cluster information 134 illustrated in FIG. 21.

Returning to FIG. 12, the feature specifying unit 115 calculates a variation in the feature value for the respective one or more features and for the respective combinations (the respective material names included in the first and second material names) of feature values classified in the process of S41 (S42). The feature specifying unit 115 determines whether the variation calculated in the process of S42 is smaller than a predetermined threshold for the respective one or more features and for the respective material names included in the first and second material names (S43).

After that, the feature specifying unit 115 specifies the most common feature value as a specific value when it is determined that the variation calculated in the process of S42 is smaller than a predetermined threshold for the respective one or more features and for the respective material names included in the first and second material names. The feature specifying unit 115 specifies a value indicating that the variation is equal to or larger than the predetermined threshold as a specific value when it is determined that the variation calculated in the process of S42 is equal to or larger than the predetermined threshold (S44). Furthermore, the feature specifying unit 115 specifies a combination of specific values specified in the process of S44 as a specific combination for the respective material names included in the first and second material names (S45). The feature specifying unit 115 generates the cluster feature information 135 including the specific combination specified in the process of S45, for example.

That is, the combinations of feature values corresponding to the respective material names are the same even when the same material name is included in a plurality of incidents if the purpose of being included in the incident is the same. Therefore, when a material name in which the combination of feature values is different from that of the greater part of other material names is included in the incident even if the material name is the same as the other material names, it can be determined that the material name is included in the incident for a purpose different from that of the greater part of other material names.

Therefore, the feature specifying unit 115 specifies the most common feature value as a specific value for the respective features and for the respective material names included in the first and second material names in the processes of S44 and S45. The feature specifying unit 115 specifies a combination of specific values as a specific combination for the respective material names included in the first and second material names.

In this way, the feature specifying unit 115 can specify a specific combination which is a combination of the greater part of feature values for the respective material names included in the first and second material names. When a material name in which the combination of feature values is different from the specific combination is included in the incident, the feature specifying unit 115 can determine that the material name is included in the incident for a purpose different from that of the greater part of other material names.

Specifically, a character string 131*k* made up of "ifconfig" is included in the incident information 131 illustrated in FIG. 18. However, in the incident information 131 illustrated in FIG. 18, a row that includes the character string 131*k* made up of "ifconfig" is a row describing that "ifconfig" is a material name which was not acquired in the fault cause examination performed in the past. Due to this, in this case, the information processing device 1 preferably does not output "ifconfig" included in the incident information 131 illustrated in FIG. 18 as a material name acquired in the fault cause examination performed in the past.

In this respect, in item number 3 of the incident information 131 illustrated in FIG. 18, a character string 131*l* corresponding to the character string 131*k* does not include a character string separated by a specific character, does not include a time point, and is not described in a table form, and a character string other than an item number includes characters other than numbers. Due to this, for example, in the process of S41, the feature specifying unit 115 sets "N" as the "setting value", the "time point", the "table form" and the "numerical value" of the information of which the "ID" is "5" as illustrated in the cluster information 134 described in FIG. 21. Moreover, for example, in the processes of S44 and S45, the feature specifying unit 115 specifies a combination of feature values of pieces of information of which the "IDs" in the cluster information 134 described in FIG. 21 are "1", "2", "3", "4", and "6" as a specific combination.

In this way, as will be described later, the information processing device 1 can determine that a combination of feature values of the information of which the "ID" in the cluster information 134 described in FIG. 21 is "5" is different from a combination (the specific combination) of feature values of the greater part of other pieces of information (the pieces of information of which the "IDs" are "1", "2", "3", "4", and "6"). Due to this, the information processing device 1 can determine that "ifconfig" included in item number 3 of the incident information 131 illustrated in FIG. 18 is not to be output as a material name acquired in the fault cause examination performed in the past.

There is a case in which the feature values corresponding to respective material names include a feature value (of which the utility value is small) which is not able to be used when specifying the material name acquired in the fault cause examination performed in the past since the variation is large. Due to this, the feature specifying unit 115 calculates a variation in the feature values for the respective features and for the respective material names included in the first and second material names (S42) before specifying the most common feature value for the respective features and for the respective material names included in the first and second material names as a specific value. The feature specifying unit 115 specifies the most common feature value among the feature values in which the calculated variation is smaller than the predetermined threshold as the specific value and specifies a value indicating that the variation is equal to or larger than the predetermined threshold as the specific value with respect to the calculated feature value in which the variation is equal to or larger than the predetermined threshold (S44).

In this way, the information processing device 1 can further improve the accuracy when specifying the material name acquired in the fault cause examination performed in the past. Hereinafter, the details of the processes of S42 to S45 will be described.

Details of Processes of S42 to S45

In the process of S42, the feature specifying unit 115 calculates a variation in the feature values corresponding to each material name for the respective one or more features and for the respective material names included in the first and second material names using Equation (1) below. In Equation (1), P(X) is a function indicating the proportion of each feature value among the feature values for the respective one or more features and for the respective material names included in the first and second material names. Moreover, H(X) is a function indicating a variation in feature values for the respective one or more features and for the respective material names included in the first and second material names.

$$H(X)=-\Sigma P(X)\log_2 P(X) \quad (1)$$

For example, "Y", "Y", "Y", "Y", "N", and "Y" are set to the "setting values" of the cluster information 134 described in FIG. 21. Due to this, the feature specifying unit 115 specifies "0.83" as "P(Y)" indicating the proportion of feature values in which "Y" is set among the feature values for the respective one or more features and for the respective material names included in the first and second material names, for example. Moreover, the feature specifying unit 115 specifies "0.17" as "P(Y)" indicating the proportion of feature values in which "N" is set among the feature values for the respective one or more features and for the respective material names included in the first and second material names, for example. In this case, the feature specifying unit 115 calculates "0.66" as H (X).

Subsequently, in the process of S43, the feature specifying unit 115 determines that "0.66" calculated in the process of S42 is smaller than a predetermined threshold when the predetermined threshold is "0.8", for example. Due to this, in the process of S44, the feature specifying unit 115 specifies "Y" which is a value which is most frequently set as "setting value" as a feature value (a specific value) corresponding to the "setting value" in the cluster information 134 described in FIG. 21, for example.

Furthermore, in the cluster information 134 described in FIG. 21, "N" is set to the "time point", the "table form", and the "numerical value". Due to this, the feature specifying unit 115 specifies "N" as the specific values corresponding to the "time point", the "table form", and the "numerical value" in the cluster information 134 described in FIG. 21 using Equation (1).

Therefore, in the process of S45, the feature specifying unit 115 specifies a combination of "Y", "N", "N", and "N" as a specific combination corresponding to the cluster information 134 described in FIG. 21 and generates the cluster feature information 135 including the specified specific combination, for example.

When the variation calculated in the process of S42 is equal to or larger than the predetermined threshold, the feature specifying unit 115 may specify "-" which is a value indicating that the variation is equal to or larger than the predetermined threshold, for example, as the specific value corresponding to the "setting value" and the like. Hereinafter, a specific example of the cluster feature information 135 will be described later.

Specific Example of Cluster Feature Information

FIG. 22 is a diagram illustrating a specific example of the cluster feature information 135. The cluster feature information 135 illustrated in FIG. 22 has the same items as the cluster information 134 described in FIG. 21.

Specifically, in the cluster feature information 135 illustrated in FIG. 22, "ifconfig" is set as the "material name" of the information of which the "ID" is "1", "Y" is set as the "setting value", "N" is set as the "time point", "N" is set as the "table form", and "N" is set as the "numerical value". Description of other information included in FIG. 22 will be omitted.

Returning to FIG. 12, the material name output unit 116 outputs a material name in which the combination of feature values calculated in the processes of S24 and S33 is the same as the specific combination specified in the process of S45 among the material names included in the first and second material names for the respective incidents (S46).

Specifically, the pieces of information of which the "material names" are "ifconfig" among the pieces of second feature value information 133 described in FIG. 20 are information of which the "IDs" is "1", "3", "4", "8", "9", and "11". Moreover, in the cluster feature information 135 described in FIG. 22, "Y", "N", "N", and "N" are set to the "setting value", the "time point", the "table form", and the "numerical value" of the information of which the "material name" is "ifconfig".

Due to this, in the process of S46, the material name output unit 116 specifies pieces of information of which the "IDs" are "1", "3", "4", "8", and "11" which are pieces of information in which "Y", "N", "N", and "N" are set to the "setting value", the "time point", the "table form", and the "numerical value" among the pieces of second feature value information 133 described in FIG. 20. Furthermore, the material name output unit 116 specifies "1", "2", "4", "5", and "6" which are pieces of information set to the "incident IDs" of the pieces of information of which the "IDs" are "1", "3", "4", "8", and "11" among the pieces of second feature value information 133 described in FIG. 20. The material name output unit 116 generates the material name information 136 including the specified information.

When "-" is set to the "setting value" and the like of the cluster feature information 135, the material name output unit 116 may determine that "-" set to the "setting value" and the like of the cluster feature information 135 corresponds to both "Y" and "N" set to the "setting value" and the like of the second feature value information 133. Specifically, the material name output unit 116 may determine that information in which "Y", "-", "N", and "N" are set to the "setting value" and the like of the cluster feature information 135, for example, corresponds to both the information in which "Y", "Y", "N", and "N" are set to the "setting value" and the like of the second feature value information 133 and the information in which "Y", "N", "N", and "N" are set to the "setting value" and the like. Hereinafter, a specific example of the material name information 136 will be described.

Specific Example of Material Name Information

FIG. 23 is a diagram illustrating a specific example of the material name information 136. The items of the material name information 136 illustrated in FIG. 23 include "ID" for identifying respective pieces of information included in the material name information 136, "incident ID" for specifying respective incidents, and "material name" in which a material name is set.

Specifically, the material name output unit 116 sets "ifconfig" to the "material name" of pieces of information of which the "incident IDs" are "1", "2", "4", "5", and "6". Description of other information included in FIG. 23 will be omitted.

That is, the material name information 136 indicates materials of which the "material names" are "ifconfig", "/var/log/messages", and "semanage" were acquired when a failure corresponding to an incident of which the "incident ID" is "3" occurred in the past, for example.

In this way, the information processing device 1 can specify a material acquired by an operator when a failure similar to the content of a newly occurred failure occurred in the past efficiently by referring to the material name information 136 when a new failure occurs.

Material Retrieving Process

Figure 13:
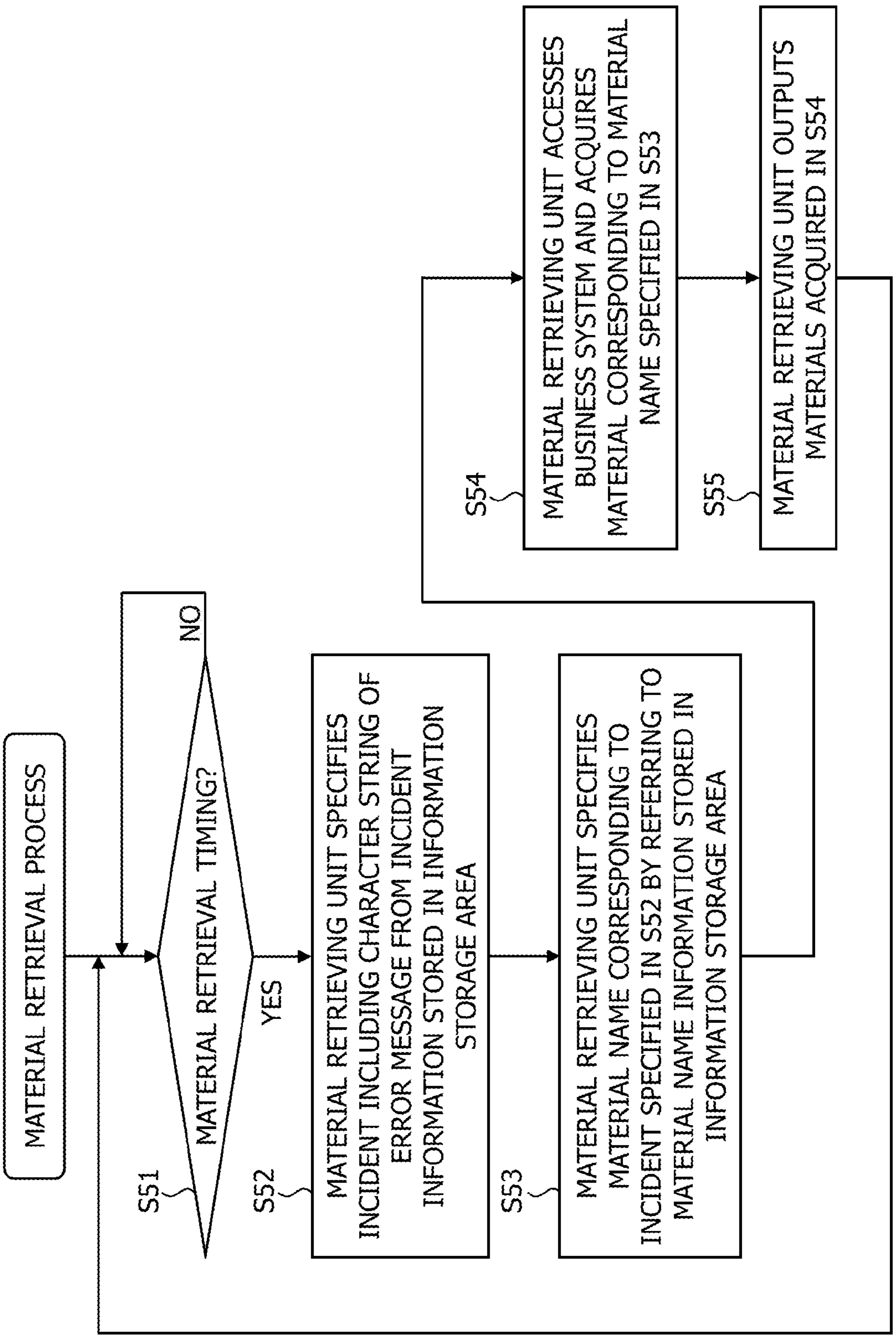
FIG. 13 is a flowchart illustrating the details of the failure analysis process according to the first embodiment.

Next, a process (hereinafter also referred to as a material retrieving process) of retrieving materials by referring to the material name information 136 when a new failure occurs will be described. FIG. 13 is a flowchart illustrating a material retrieving process.

As illustrated in FIG. 13, a material retrieving unit 117 of the information processing device 1 waits until a material retrieving timing (S51: NO). The material retrieving timing may be a timing at which an error message is output from a business system, for example.

When the material retrieving timing is reached (S51: YES), the material retrieving unit 117 specifies an incident including a character string of the error message output from the business system from the incident information 131 stored in the information storage area 130, for example (S52). After that, the material retrieving unit 117 specifies a material name corresponding to the incident specified in the process of S52 by referring to the material name information 136 stored in the information storage area 130 (S53).

Subsequently, the material retrieving unit 117 accesses the business system that has output the error message, for example, and acquires a material having the material name specified by the process of S53 (S54). The material retrieving unit 117 outputs the material acquired in the process of S54 (S55). Specifically, the material retrieving unit 117 outputs the material acquired in the process of S54 to the operation terminal 3.

In this way, the operator can acquire materials useful for examining the causes of a newly occurred failure when a new failure occurs.

Details of Second Embodiment

Next, details of a second embodiment will be described. FIGS. 24 to 27 are flowcharts illustrating a failure analysis process according to the second embodiment. FIGS. 28 and 29 are diagrams illustrating the failure analysis process according to the second embodiment. The failure analysis process illustrated in FIGS. 24 to 27 will be described with reference to FIGS. 28 and 29.

The failure analysis process of the second embodiment is performed such that information that is not determined to be needed among pieces of information included in the first feature value information 132 is not included in the second feature value information 133. In this way, the information processing device 1 can acquire materials needed for the fault cause examination more efficiently.

Figure 24:
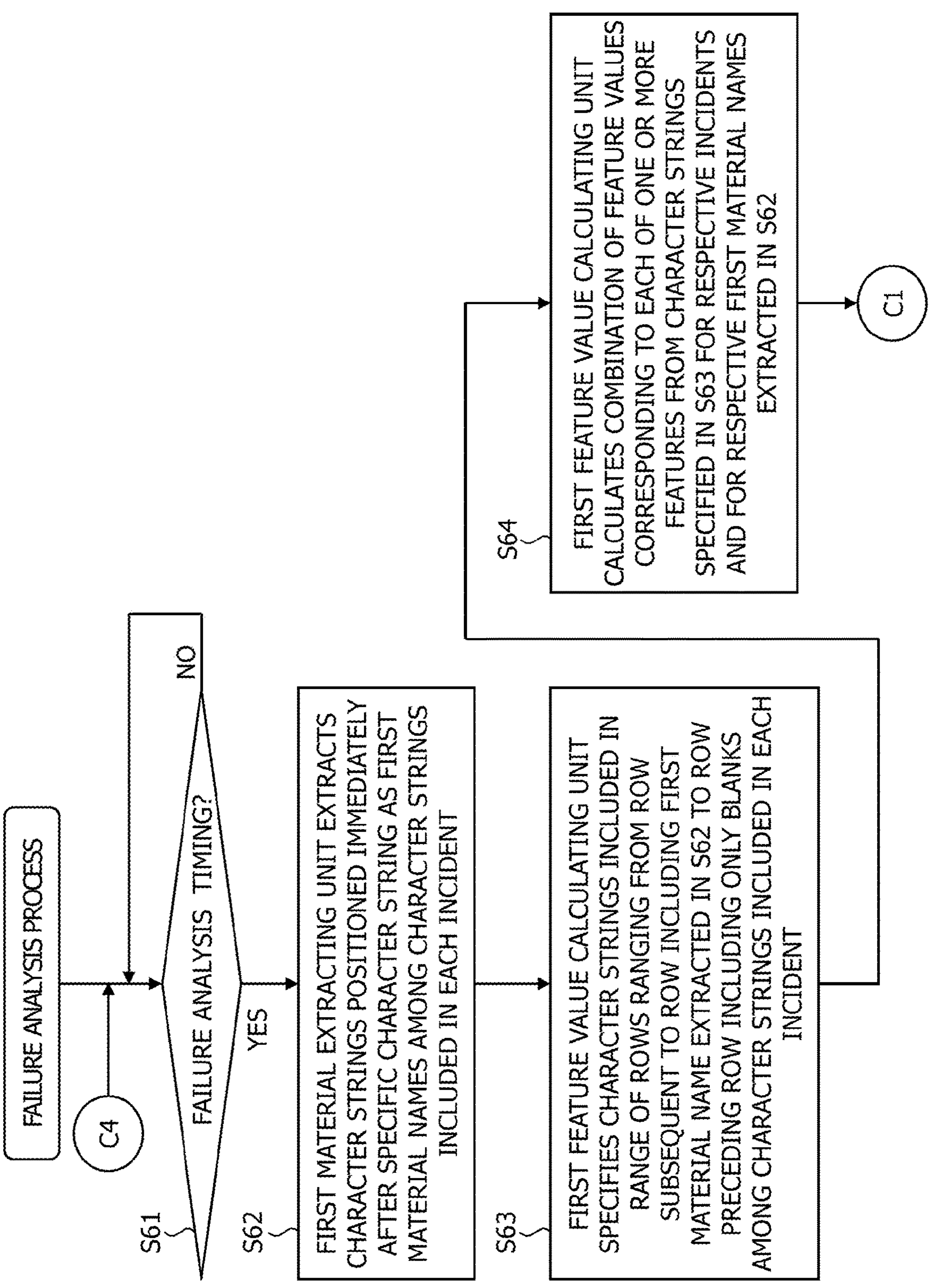
FIG. 24 is a flowchart illustrating a failure analysis process according to the second embodiment.

As illustrated in FIG. 24, the first material extracting unit 111 waits until a failure analysis timing (S61: NO). When the failure analysis timing is reached (S61: YES), the first material extracting unit 111 extracts each of character strings positioned immediately after a specific character string among character strings in each incident included in the incident information 131 stored in the information storage area 130 as the first material name similarly to the first embodiment (S62).

Subsequently, the first feature value calculating unit 112 specifies a character string included in a range of rows ranging from a row subsequent to a row including the first material name extracted in the process of S62 to a row preceding a row including only blanks among the character strings in each incident included in each of the pieces of incident information 131 similarly to the first embodiment (S63). The first feature value calculating unit 112 calculates a combination of feature values corresponding to each of one or more features from the character string specified in the process of S63 for the respective incidents and for the respective first material names extracted in the process of S62 (S64).

Figure 25:
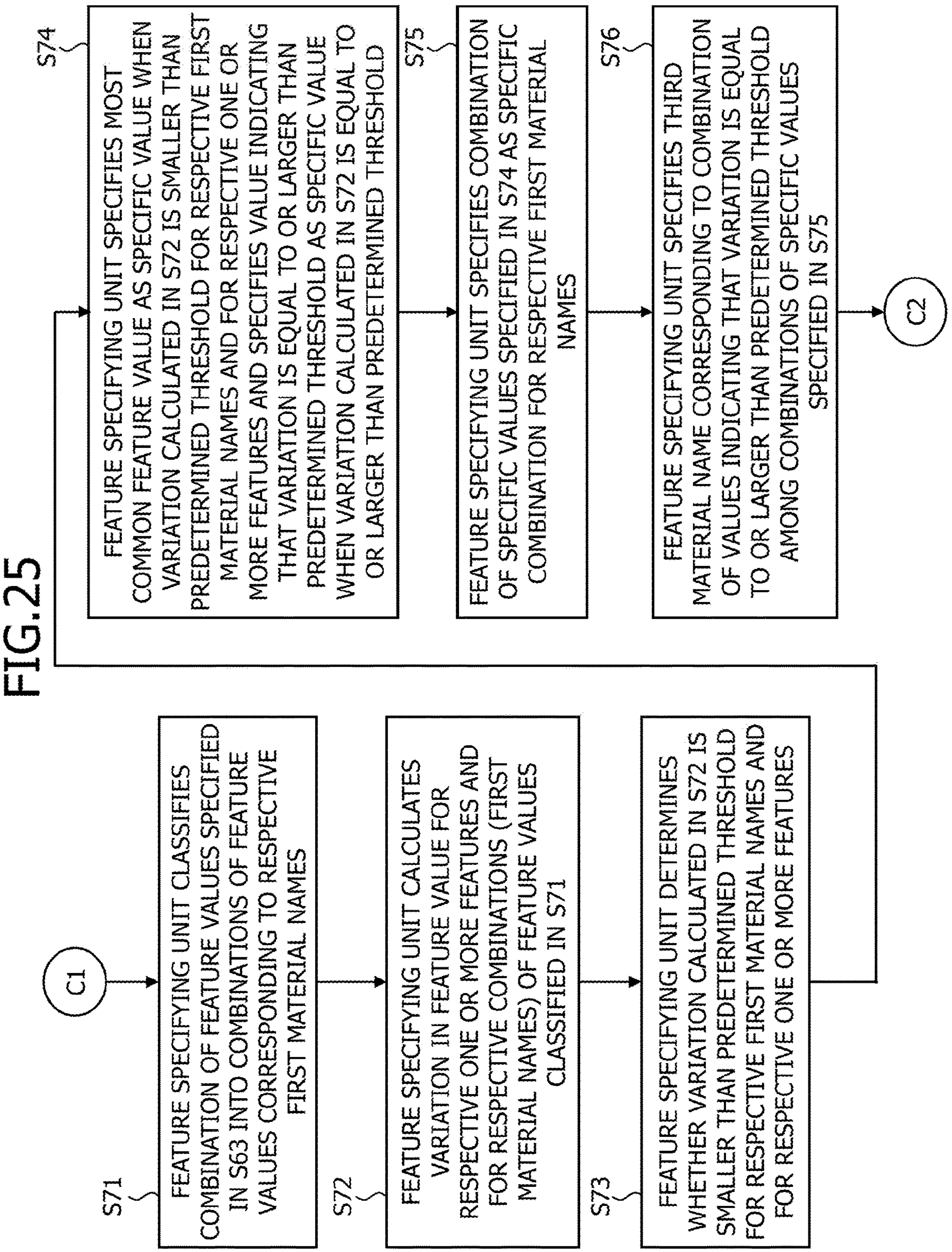
FIG. 25 is a flowchart illustrating a failure analysis process according to the second embodiment.

After that, as illustrated in FIG. 25, the feature specifying unit 115 classifies the combination of feature values specified in the process of S63 into respective combinations of feature values corresponding to the respective first material names unlike the first embodiment (S71). The feature specifying unit 115 calculates a variation in the feature value for the respective one or more features and for the respective combinations (the first material names) of the feature values classified in the process of S71 (S72). Furthermore, the feature specifying unit 115 determines whether the variation calculated in the process of S72 is smaller than a predetermined threshold for the respective one or more features and for the respective first material names (S73).

Subsequently, the feature specifying unit 115 specifies the most common feature value as a specific value when it is determined that the variation calculated in the process of S72 is smaller than a predetermined threshold for the respective one or more features and for the respective first material names. The feature specifying unit 115 specifies a value indicating that the variation is equal to or larger than the predetermined threshold as a specific value when it is determined that the variation calculated in the process of S72 is equal to or larger than the predetermined threshold (S74). Furthermore, the feature specifying unit 115 specifies a combination of specific values specified in the process of S74 as a specific combination for the respective first material names (S75). The feature specifying unit 115 specifies a third material name corresponding to a combination made up of valves in which the variation is equal to or larger than the predetermined threshold among the combinations of specific values specified in S75 (S76).

Figure 26:
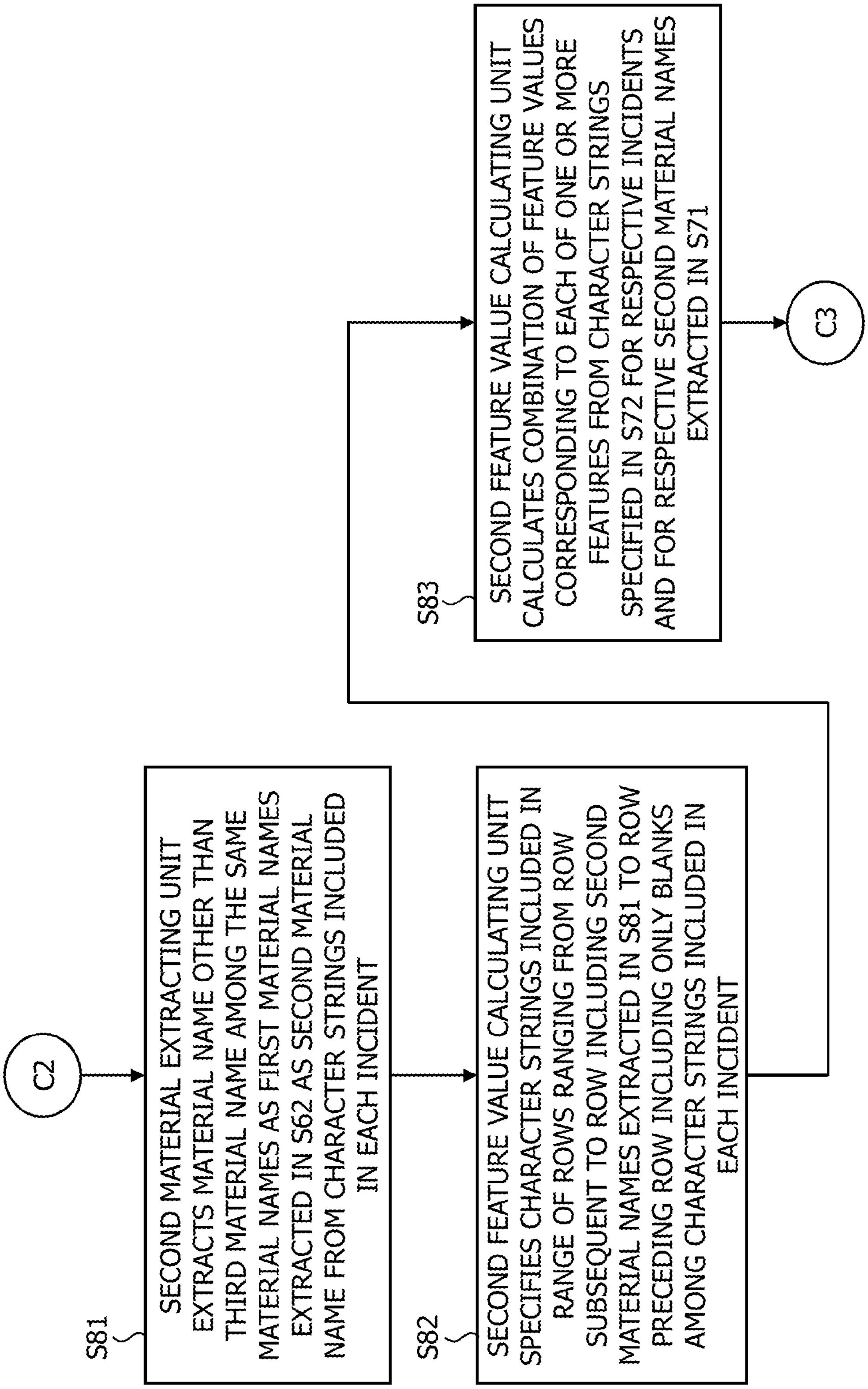
FIG. 26 is a flowchart illustrating a failure analysis process according to the second embodiment.

After that, as illustrated in FIG. 26, the second material extracting unit 113 extracts a material name other than the third material name among the material names the same as the first material name extracted in the process of S62 from the character strings in each incident included in the incident information 131 stored in the information storage area 130 as a second material name unlike the first embodiment (S81).

That is, the information processing device 1 of the second embodiment specifies a material name (the third material name) corresponding to a combination of feature values (of which the utility value is small) which are not able to be used when specifying the material name acquired in the fault cause examination performed in the past since the variation is large. Furthermore, the information processing device 1 of the second embodiment excludes the material name specified as the third material name when extracting the second material name.

In this way, the information processing device 1 of the second embodiment can generate the material name information 136 which enables materials needed for the fault cause examination to be acquired more efficiently. Hereinafter, a specific example of the processes of S71 to S81 will be described.

Specific Example of Processes of S71 to S81

FIGS. 28 and 29 are diagrams illustrating a specific example of the processes of S71 to S81. Specifically, FIG. 28 is a diagram illustrating the first feature value information 132 (hereinafter referred to as first feature value information 132*a*) of the second embodiment. Moreover, FIG. 29 is a diagram illustrating the cluster information 134 (hereinafter referred to as cluster information 134*a*) of the second embodiment.

The first feature value information 132*a* illustrated in FIG. 28 further includes information of which the "ID" is "12" and information of which the "ID" is "13" as compared to the first feature value information 132*a* described in FIG. 19.

Specifically, in the first feature value information 132*a* illustrated in FIG. 28, "7" is set as the "incident ID" of the information of which the "ID" is "12", and "2" is set as the "item number", and "AAA" is set as the "material name". In the first feature value information 132*a* illustrated in FIG. 28, "Y" is set as the "setting value" of the information of which the "ID" is "12", "Y" is set as the "time point", "Y" is set as the "table form", and "Y" is set as the "numerical value". Moreover, in the first feature value information 132*a* illustrated in FIG. 28, "8" is set as the "incident ID" of the information of which the "ID" is "13", "3" is set as the "item number", and "AAA" is set as the "material name". Moreover, in the first feature value information 132*a* illustrated in FIG. 28, "N" is set as the "setting value" of the information of which the "ID" is "13", "N" is set as the "time point", "N" is set as the "table form", and "N" is set as the "numerical value".

As illustrated in FIG. 29, the feature specifying unit 115 extracts information indicating the "setting value", the "time point", the "table form", and the "numerical value" of the information of which the "material name" is "AAA" from the pieces of first feature value information 132*a* illustrated in FIG. 28, for example, and generates the cluster information 134*a* (S71).

Here, when the predetermined threshold in the process of S73 is "0.8", and when the specific value corresponding to the material of which the "material name" is "AAA" is calculated using Equation (1), all specific values are equal to or larger than the predetermined threshold (S72 to S74). Due to this, the feature specifying unit 115 specifies the material name of the material of which the "material name" is "AAA" as the third material name (S75 and S76). Therefore, in this case, the second material extracting unit 113 generates the second feature value information 133 which does not include information on the materials of the "material names" are "AAA" (S81).

After that, the second feature value calculating unit 114 specifies a character string included in a range of rows ranging from a row subsequent to a row including the second material name extracted in the process of S81 to a row preceding a row including only blanks among the character strings in each incident included in the respective pieces of incident information 131 similarly to the first embodiment (S82). The second feature value calculating unit 114 calculates a combination of feature values corresponding to each of one or more features from the character string specified in the process of S82 for the respective incidents and for the respective second material names extracted in the process of S81 (S83).

Figure 27:
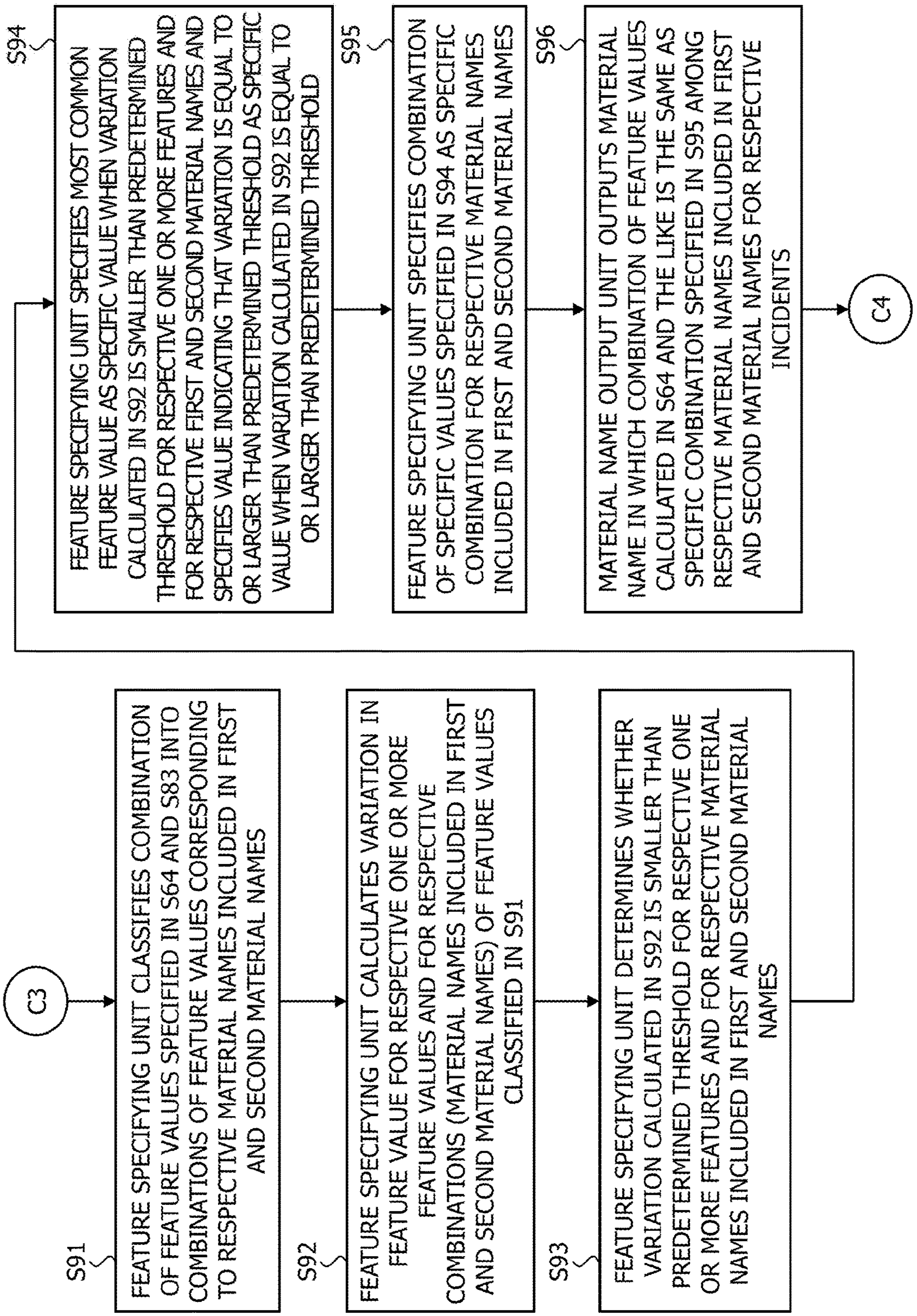
FIG. 27 is a flowchart illustrating a failure analysis process according to the second embodiment.

Subsequently, as illustrated in FIG. 27, the feature specifying unit 115 classifies the combination of feature values specified in the processes of S64 and S83 into respective combinations of feature values corresponding to the respective material names included in the first and second material names similarly to the first embodiment (S91). Moreover, the feature specifying unit 115 calculates a variation in the feature value for the respective one or more features and for the respective combinations (the respective material names included in the first and second material names) of feature values classified in the process of S91 (S92). Furthermore, the feature specifying unit 115 determines whether a variation calculates whether the variation calculated in the process of S92 is smaller than a predetermined threshold for the respective one or more features and for the respective material names included in the first and second material names (S93).

After that, the feature specifying unit 115 specifies the most common feature value as a specific value when it is determined that the variation calculated in the process of S92 is smaller than a predetermined threshold for the respective one or more features and for the respective material names included in the first and second material names. The feature specifying unit 115 specifies a value indicating that the variation is equal to or larger than the predetermined threshold as a specific value when it is determined that the variation calculated in the process of S92 is equal to or larger than the predetermined threshold (S94). Furthermore, the feature specifying unit 115 specifies a combination of specific values specified in the process of S94 as a specific combination for the respective material names included in the first and second material names (S95).

The material name output unit 116 outputs a material name in which the combination of feature values calculated in the processes of S64 and S83 is the same as the specific combination specified in the process of S95 among the material names included in the first and second material names for the respective incidents (S96).

In this way, the information processing device 1 of the second embodiment can generate the material name information 136 which enables materials needed for the fault cause examination to be acquired more efficiently.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing therein a failure analysis program that causes a computer to execute a process comprising:

first extracting, for respective incidents, first material names that satisfy a first condition from character strings included in each incident;

first calculating a combination of feature values corresponding respectively to one or more features by determining feature values corresponding respectively to one or more features depending on whether character strings correlated with the extracted first material names match content corresponding to each of the one or more features, for the respective incidents and for the respective first material names;

second extracting, for the respective incidents, second material names, which are the same material names as the first material name, from the character strings included in each incident;

second calculating a combination of feature values corresponding respectively to the one or more features from character strings correlated with the extracted second material names, for the respective incidents and for the respective second material names;

specifying a specific combination that satisfies a second condition from the combinations of feature values corresponding to the respective material names, for the respective material names included in the first and second material names; and outputting, for the respective incidents, material names, in which the calculated combination of feature values is the same as the specific combination, among the material names included in the first and second material names.

2. The non-transitory computer-readable storage medium according to claim 1, wherein the first extracting, as the first material names, character strings, which are included in the same row as a specific character string and are positioned after the specific character string, among the character strings included in each incident.

3. The non-transitory computer-readable storage medium according to claim 2, wherein the specific character string is a prompt character string.

4. The non-transitory computer-readable storage medium according to claim 1, wherein the character strings correlated with the first material names are character strings which are included in rows ranging from a row subsequent to a row that includes the first material name to a row preceding a row that includes only blanks among the character strings included in each incident.

5. The non-transitory computer-readable storage medium according to claim 1, wherein the first calculating includes:

calculating a first value as a feature value of a specific feature included in the one or more features when the character strings correlated with the first material names match the content of the specific feature, and calculating a second value as a feature value of the specific feature when the character strings correlated with the first material names do not match the content of the specific feature.

6. The non-transitory computer-readable storage medium according to claim 5, wherein the one or more features include a first feature indicating that a specific character is included in a character string, and the first calculating includes:

specifying the first value as the feature value of the first feature when the character strings correlated with the first material names include a character string separated by a specific character, and specifying the second value as the feature value of the first feature when the character strings correlated with the first material names do not include a character string separated by the specific character.

7. The non-transitory computer-readable storage medium according to claim 5, wherein the one or more features include a second feature indicating that a time point is included in a character string, and the first calculating includes:

specifying the first value as the feature value of the second feature when the character strings correlated with the first material names include a time point, and specifying the second value as the feature value of the second feature when the character strings correlated with the first material names do not include a time point.

8. The non-transitory computer-readable storage medium according to claim 5, wherein the one or more features include a third feature indicating that a character string is described in a table form, and the first calculating includes:

specifying the first value as the feature value of the third feature when the character strings correlated with the first material name are described in a table form, and specifying the second value as the feature value of the third feature when the character strings correlated with the first material names are not described in a table form.

9. The non-transitory computer-readable storage medium according to claim 5, wherein the specifying includes:

calculating a variation in the feature value, for the respective second material names and for the respective one or more features, determining whether the calculated variation is smaller than a predetermined threshold, for the respective second material names and for the respective one or more features, specifying the most common feature value as a specific value when the calculated variation is smaller than the predetermined threshold, for the respective second material names and for the respective one or more features, specifying a value indicating that the variation is equal to or larger than the predetermined threshold as the specific value when the calculated variation is equal to or larger than the predetermined threshold, for the respective second material names and for the respective one or more features, and specifying a combination of the specific values as the specific combination, for the respective second material names.

10. The non-transitory computer-readable storage medium according to claim 9, wherein the program further causes the computer to execute a process comprising:

before the second extracting, calculating a variation in the feature value, for the respective first material names and for the one or more features;

determining whether the calculated variation is smaller than a predetermined threshold, for the respective first material names and for the one or more features;

specifying the most common feature value as the specific value when the calculated variation is smaller than the predetermined threshold, for the respective first material names and for the respective one or more features;

specifying a value indicating that the variation is equal to or larger than the predetermined threshold as the specific value when the calculated variation is equal to or larger than the predetermined threshold, for the respective first material names and for the respective one or more features;

specifying a combination of the specific values as the specific combination, for the respective first material names; and specifying a third material name corresponding to a combination of values indicating that the variation is equal to or larger than the predetermined threshold among combinations of the specified specific values, and the second extracting includes extracting, for the respective incidents, material names other than the third material name among the same material names as the first material names from the character strings included in each incident, as the second material names.

11. A failure analysis device comprising:

a memory; and a processor coupled to the memory configured to:

extract, for respective incidents, first material names that satisfy a first condition from character strings included in each incident;

calculate a combination of feature values corresponding respectively to one or more features by determining feature values corresponding respectively to one or more features depending on whether character strings correlated with the extracted first material names match content corresponding to each of the one or more features, for the respective incidents and for the respective first material names;

extract, for the respective incidents, second material names, which are the same material names as the first material names, from the character strings included in each incident;

calculate a combination of feature values corresponding to respectively the one or more features from character strings correlated with the extracted second material names, for the respective incidents and for the respective second material names;

satisfy a second condition from the combinations of feature values corresponding to the respective material names, for the respective material names included in the first and second material names; and output, for the respective incidents, material names, in which the calculated combination of feature values is the same as the specific combination, among the material names included in the first and second material names.

12. A failure analysis method comprising:

extracting, by a processor, for respective incidents, first material names that satisfy a first condition from character strings included in each incident;

calculating, by a processor, a combination of feature values corresponding respectively to one or more features by determining feature values corresponding respectively to one or more features depending on whether character strings correlated with the extracted first material names match content corresponding to each of the one or more features, for the respective incidents and for the respective first material names;

extracting, by a processor, for the respective incidents, second material names, which are the same material names as the first material names, from the character strings included in each incident;

calculating, by a processor, a combination of feature values corresponding respectively to the one or more features from character strings correlated with the extracted second material names, for the respective incidents and for the respective second material names;

specifying, by a processor, a specific combination that satisfies a second condition from the combination of feature values corresponding to the respective material names, for the respective material names included in the first and second material names; and outputting, by a processor, for the respective incidents, material names in which the calculated combination of feature values is the same as the specific combination among the material names included in the first and second material names.

* * * * *